United States Patent
Ishikawa et al.

(10) Patent No.: US 6,719,110 B2
(45) Date of Patent: Apr. 13, 2004

(54) WET TYPE FRICTION CLUTCH AND ELECTROMAGNETIC CLUTCH

(75) Inventors: Yasuhiko Ishikawa, Tochigi (JP);
Makoto Ishizuka, Tochigi (JP);
Yoshiyuki Nakabayashi, Tochigi (JP);
Kouji Iizuka, Tochigi (JP); Yasushi Koshigaya, Tochigi (JP); Yoshiaki Kitsunezuka, Tochigi (JP); Kenji Karasawa, Tochigi (JP); Masayuki Sayama, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/189,220

(22) Filed: Jul. 2, 2002

(65) Prior Publication Data

US 2003/0015385 A1 Jan. 23, 2003

(30) Foreign Application Priority Data

Jul. 5, 2001 (JP) ........................ 2001-204974
Jul. 5, 2001 (JP) ........................ 2001-205271
Oct. 9, 2001 (JP) ........................ 2001-311299

(51) Int. Cl.$^7$ .......................... F16D 27/115; F16D 13/72
(52) U.S. Cl. .................. 192/35; 192/70.12; 192/84.91; 192/113.34
(58) Field of Search ................ 192/35, 70.12, 192/84.7, 84.91, 84.96, 113.34

(56) References Cited

U.S. PATENT DOCUMENTS

| | | | | |
|---|---|---|---|---|
| 4,313,533 A | * | 2/1982 | Aschauer ............... | 192/113.34 |
| 4,958,712 A | * | 9/1990 | Suganuma et al. ...... | 192/70.12 |
| 5,495,927 A | * | 3/1996 | Samie et al. ............. | 197/70.12 |
| 5,538,121 A | * | 7/1996 | Hering ..................... | 192/70.12 |
| 2002/0125096 A1 | * | 9/2002 | Yamazaki et al. ............ | 192/35 |

* cited by examiner

Primary Examiner—Richard M. Lorence
(74) Attorney, Agent, or Firm—Morrison & Foerster LLP

(57) ABSTRACT

A wet type friction clutch and an electromagnetic clutch is disclosed wherein a pilot clutch 61 is disposed in a magnetic flux path 95 of an electromagnet 57 and is kept between an armature 71 and the electromagnet 57. Upon excitation of the electromagnet 57, the armature 57 is retracted to allow the pilot clutch 61 to be coupled. The pilot clutch 61 includes a plurality of clutch plates 87, 89 which are interleaved with respect to one another for sliding movements. Adjacent clutch plates 87, 87A, 87B, 89, 89A, 89B, 89C, 89D, 89E, 89F are formed with oil guide passageways 86, 96, 98, 106, 108, 110, 114 to create a hydrodynamic pressure effect to allow the clutch plates to be separated with a limited drag torque. Further, the clutch plate has magnetic flux path forming portions 89b, 89c, at inner and outer peripheral sides, between which through-bores 112 are formed to allow bridge portions 120 to be intervened between the through-bores, with each of the bridge portions being configured such that opposing walls of the bridge portions of adjacent clutch plates have reduced contact surface areas to eliminate a leakage of a magnetic flux.

15 Claims, 20 Drawing Sheets

PRIOR ART

WET TYPE FRICTION CLUTCH AND ELECTROMAGNETIC CLUTCH

BACKGROUND OF THE INVENTION

The present invention relates to a wet type friction clutch and an electromagnetic clutch for use in a coupling device or a differential gear device of a vehicle.

Japanese Patent Provisional Publication No. 10-329562 discloses a torque transmitting device 301 which is exemplarily shown in FIG. 1.

The torque transmitting device 301 is comprised of a rotary case 303, an inner shaft 305, a main clutch 307, a ball cam 309, a pressure plate 311, a cam ring 313, a pilot clutch 315, an armature 317 and an electromagnet 319.

The torque transmitting device 301 is disposed between separate rear propeller shaft components which are rendered to be separate from one another during a two wheel drive condition in a four wheel drive vehicle, with the rotary case 303 being connected to a front side propeller shaft component while the inner shaft 305 is connected to a rear side propeller shaft component.

The rotary case 303 is comprised of a cylindrical member 321, to which the main clutch 307 is coupled, and a rotor 323 which forms a part of a magnetic flux path of the electromagnet 319, with the cylindrical member 321 being made of stainless steel to preclude a magnetic flux from being leaked from the magnetic flux path.

The main clutch 307 includes a multi plate clutch disposed between the cylindrical member 321 and the inner shaft 305, and the ball cam 309 is disposed between the pressure plate 311, which is connected to the inner shaft 305 for free movement, and the cam ring 313.

The pilot clutch 315 includes a multi plate clutch and is kept between the armature 317 and the rotor 323.

The torque transmitting device 301 is arranged such that the magnetic flux path of the electromagnet 319 is defined as indicated by a magnetic flux path 325 with the clutch rotor 323, the pilot clutch 315 and the armature 317 whereby, when the electromagnet 319 is energized, the armature 317 is attracted with the magnetic flux path 325 to cause the pilot clutch 315 to be pressured contact into a coupled condition.

Upon coupling of the pilot clutch 315, a pilot torque is produced to allow a drive power output of an engine to be imparted to the ball cam 309 to create a cam thrust force by which the main clutch 307 is urged to cause the torque transmitting device 301 to be coupled to transfer the drive power output to the rear wheel side to render the vehicle to be operative in the four wheel drive condition.

Further, if the excitation of the electromagnet 319 is interrupted, the pilot clutch 315 is released to cause the ball cam 309 to lose the cam thrust force whereby the main clutch 307 is released to uncouple the torque transmitting device 301 for disconnecting the rear wheel side to render the vehicle operative in the two wheel drive condition.

The pilot clutch 315 including the multi plate clutch is comprised of a plurality of outer plates and a plurality of inner plates, which are alternately interleaved with respect to one another. Further, the outer plates are disposed in engagement with the cylindrical member 321 and, to this end, an outer periphery of each outer plate is formed with engaging protrusions circumferentially spaced in a given distance. The inner plates are disposed in engagement with the cam ring 313 and, to this end, an inner periphery of each inner plate is formed with engaging protrusions circumferentially spaced in a given distance.

The pilot clutch 315 is arranged to be coupled when the interleaved outer plates and the inner plates are brought into pressured contact with respect to one another to create a frictional force due to the magnetic flux path 325 of the electromagnet 319 to cause the armature 317 to be attracted. In contrast, during an uncoupled condition of the pilot clutch 315, since the outer plates and the inner plates are operative for free sliding movements, there is a need for these components to be lubricated with oil and, for such a purpose, the rotary case 303 is filled with oil.

With the pilot clutch 315, since the outer plates and the inner plates are sliding under interleaved conditions even during the two wheel drive condition where the electromagnet 319 is de-energized, there is a probability for a drag torque to be created between the adjacent clutch plates due to the viscosity of oil at a low operating temperature. As the drag torque exceeds a given level, the outer plates and the inner plates tend to operate just as they are coupled, inviting a risk for the pilot clutch 315 to produce the pilot torque which is transferred through the ball cam 309 to the main clutch 307 which is consequently exerted with an urging force to transfer the drive power output to the rear wheel side.

During a time interval in which the coupling of the clutch is not required, if the drive power output is transferred to the rear wheel side, the vehicle encounters a drive power loss with a resultant adverse affect in a running characteristic or fuel consumption of the vehicle.

Further, while the magnetic flux produced by the electromagnet 319 forms the magnetic flux path 325 through which the magnetic flux path is circulated via the clutch rotor 323, the pilot clutch 315 and the armature 317 set forth above, the inner clutch plates of the pilot clutch 315 are arranged to be formed with through-bores to preclude a reduction in the magnetic flux density caused by the leakage of the magnetic flux from the circulated magnetic flux path 325.

The above described inner clutch plate is formed with a plurality of the through-bores between which a bridge portion is intervened. Outer clutch plates, which are not shown, are formed with through-bores with a similar structure. With such a structure, an inner peripheral portion and an outer peripheral portion of each through-bore form magnetic flux path forming portions which serve as routes of the circulated magnetic flux path 325.

However, even in a case where the clutch plate of such a state-of-the-art electromagnet clutch is formed with the circumferentially extending through-bores in an area between the inner peripheral, magnetic flux path forming portion and the outer peripheral, magnetic flux path forming portion, the clutch plate is inevitably formed with the above described bridge portions on a circumferential periphery at six locations thereof for interconnecting the inner peripheral portion and the outer peripheral portion, with associated opposing walls of the above described bridge portions of the mutually adjacent clutch plates bearing in contact with one another.

As a result, the associated opposing walls, held in contact with respect to one another, of the bridge portions become loopholes through which the magnetic flux circulating in the magnetic flux path forming portion escapes to an opposing magnetic flux path, resulting in a reduction in the magnetic flux density produced by the electromagnet 319 to decrease the attraction force to be exerted to the armature 317 for thereby causing the coupling force of the pilot clutch mechanism to be lessened.

In order for the amount of escape of the magnetic flux to be decreased, further, it is conceivable to reduce the number of the above described bridge portions, but the clutch plate undergoes a decreased strength with a deterioration in the durability.

SUMMARY OF THE INVENTION

It is, therefore, an object of the present invention to provide a wet type friction clutch and an electromagnetic clutch which have an ability of eliminating a drag torque between clutch plates with no undesired coupling of the clutch plates whereby, when applied to a torque transmitting device (coupling device) of a vehicle, the vehicle has an improved fuel consumption with no adverse effect to a running characteristic.

It is another object of the present invention to provide a clutch plate for an electromagnetic clutch which includes a bridge portion with a reduced whole surface area, while ensuring a strength required for the bridge portion intervening between through-bores, for decreasing the amount of escape of a magnetic flux to provide an improved attracting force of an electromagnet.

According to one aspect of the present invention, there is provided a wet type friction clutch operatively disposed between first and second torque transmission components, which comprises a first plurality of clutch plates disposed for rotation with the first torque transmission components, a second plurality of clutch plates interleaved with the first plurality of clutch discs and disposed for rotation with the second torque transmission component, a clutch operator operative to selectively render the first and second plurality of clutch plates to engage or disengage, and an oil guide passageway formed on at least one of adjacent clutch plates to introduce an oil to sliding areas of the adjacent clutch plates and extending in a given length along circumferential peripheries of the adjacent clutch plates to communicate with an oil chamber to allow the oil to be introduced into the sliding areas of the adjacent clutch plates.

The clutch plates are lubricated with the oil retained in the oil guide passageway formed in at least one of the adjacent clutch plates.

According to the present invention, since the oil guide passageway formed in at least one of the adjacent clutch plates communicates with the oil chamber, rotation of the clutch plate allows the oil to be introduced to the oil guide passageway due to a "Weissenberg Effect" to cause the oil to be guided to sliding areas of the adjacent clutch plates for thereby compelling the adjacent clutch plates to be smoothly separated from one another with the oil which is introduced thereto. This results in an effective elimination of the drag torque between the clutch plates.

Accordingly, in a case where the wet type friction clutch of the present invention is applied to a pilot clutch of a coupling device or a differential gear device of a vehicle, there is no probability for the vehicle to inadvertently encounter a four wheel drive condition, resulting in a stabilized running characteristic with no loss in drive power output to improve fuel consumption.

According to another aspect of the present invention, there is provided a wet type friction clutch operatively disposed between first and second torque transmission components, which comprises a first plurality of clutch plates disposed for rotation with the first torque transmission components, a second plurality of clutch plates interleaved with the first plurality of clutch discs and disposed for rotation with the second torque transmission component, a clutch operator operative to selectively render the first and second plurality of clutch plates to engage or disengage, a first oil guide passageway formed on at least one of adjacent clutch plates to introduce an oil into sliding areas of the adjacent clutch plates, and a second oil guide passageway formed on the other one of the adjacent clutch plates, wherein the first oil guide passageway is formed to have a volume different from that of the second oil guide passageway to allow the oil to be introduced into the sliding areas of the adjacent clutch plates from the first and second oil guide passageways.

According to another aspect of the present invention, there is provided a clutch plate for an electromagnetic clutch having a group of clutch plates including first clutch plates disposed for rotation with a drive shaft and second clutch plates interleaved with the first clutch plates and disposed for rotation with a driven shaft, an electromagnet disposed at one side of the group of clutch plates, and an armature disposed at the other side of the group of clutch plates to be retracted by an electromagnetic force generated by the electromagnet for thereby causing the group of clutch plates to be brought into pressured contact such that the clutch plates are coupled, wherein the clutch plate has a plurality of through-bores, formed along a circumferential periphery of the clutch plate in alignment with a magnetic flux path forming portion which establishes a magnetic flux path generated by the electromagnet, between which a bridge portion is intervened for interconnecting an inner circumferential periphery and an outer circumferential periphery of the clutch plate. The clutch plate comprises a body formed with oil guide passageways, composed of the through-bores, and the bridge portions, each of which includes opposing walls facing opposed clutch plates, respectively, and an inner wall facing each of the through-bores, wherein each of the bridge portions is formed such that, while ensuring a given cross sectional area, a circumferentially peripheral length of the opposing wall is shorter than that of each bridge portion.

With such a structure, the bridge portion has a given cross sectional area for thereby providing a strength required for interconnecting the inner peripheral portion and the outer peripheral portion of the clutch plate, with the opposing walls of the bridge portion having the circumferentially peripheral length configured to be shorter than the circumferentially peripheral portion of the bridge portion such that the cross sectional shape of the bridge portion has a reduced wall thickness portion extending toward the inner wall from at least one circumferentially peripheral end portion of the opposing wall.

Accordingly, with such a bridge portion, since the contact surface areas of the opposing walls of the bridge portions of the mutually adjacent clutch plates are decreased, it is possible to reduce the amount of leakage of the magnetic flux passing through the bridge portions.

According to another aspect of the present invention, there is provided a clutch plate for an electromagnetic clutch having a group of clutch plates including first clutch plates disposed for rotation with a drive shaft and second clutch plates interleaved with the first clutch plates and disposed for rotation with a driven shaft, an electromagnetic coil disposed at one side of the group of clutch plates, and an armature disposed at the other side of the group of clutch plates to be retracted by an electromagnetic force generated by the electromagnetic coil for thereby causing the group of clutch plates to be brought into pressured contact such that the clutch plates are coupled, wherein the clutch plate has a plurality of through-bores, formed along a circumferential periphery of the clutch plate in alignment with a magnetic flux path forming portion which establishes a magnetic flux path generated by the electromagnetic coil, between which a bridge portion is intervened for interconnecting an inner circumferential periphery and an outer circumferential periphery of the clutch plate. The clutch plate comprises a body formed with oil guide passageways, composed of the through-bores, and the bridge portions each of which includes opposing walls facing opposed clutch plates, respectively, and an inner wall facing each of the through-bores, wherein each of the bridge portions is formed such that, while ensuring a given cross sectional area, each bridge portion is smaller in thickness than the magnetic flux path forming portion.

With such a structure, the bridge portion has a given cross sectional area for thereby providing a required strength, with the thickness of the bridge portion being designed to be smaller than that of the magnetic flux path forming portion to provide no probability of contact between the opposing walls of the associated bridge portions of the mutually adjacent clutch plates for enabling elimination of the amount of leakage of the magnetic flux via the associated bridge portions.

DETAILED DESCRIPTION OF THE PREFERRED EMBODIMENTS

First Preferred Embodiment

Referring to FIGS. 2 to 5, a vehicle rear differential (rear differential unit) 1 which is furnished with an inner plate and an outer plate of a first preferred embodiment of the present invention is described below.

Figure 1:
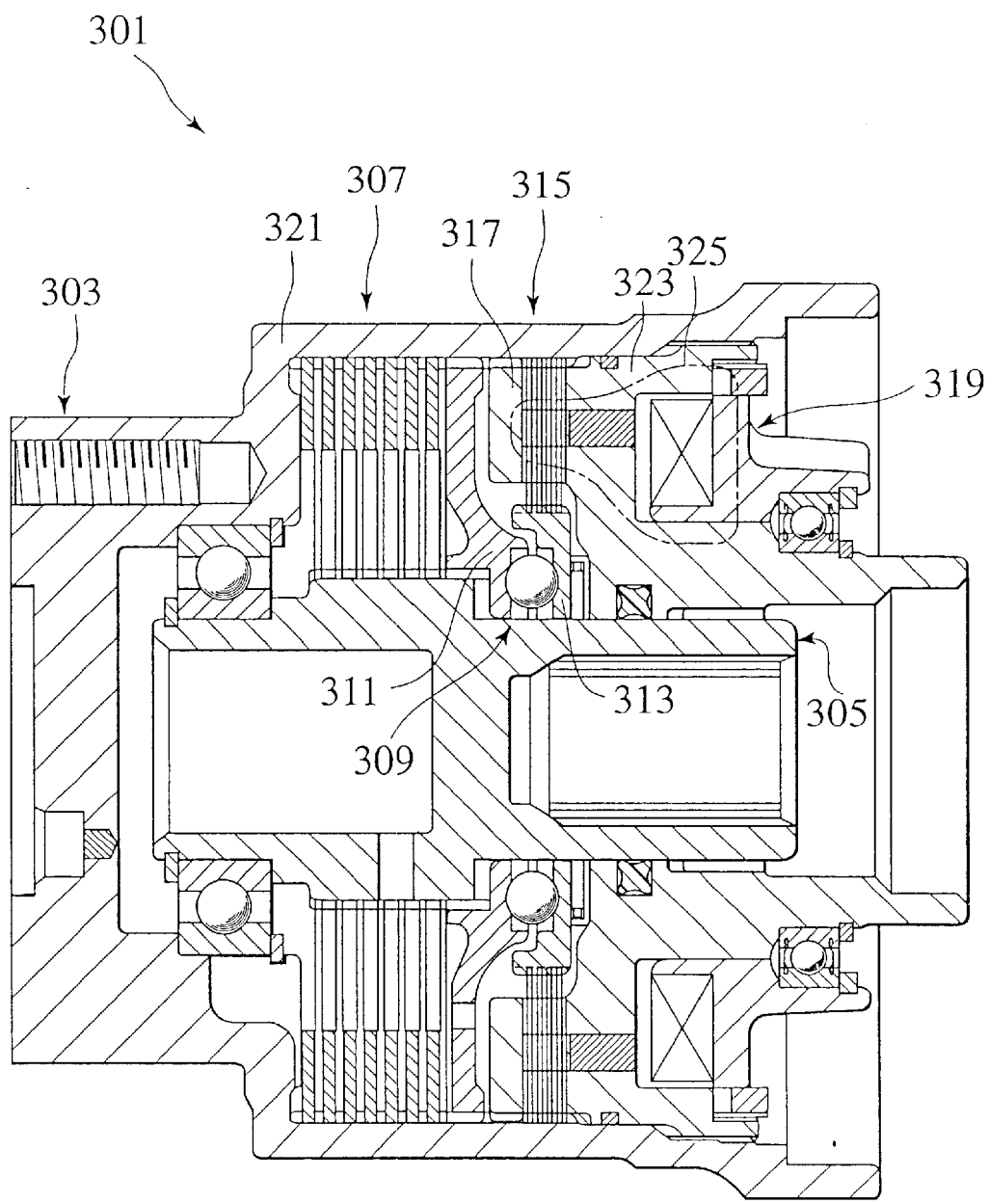
FIG. 1 is a cross sectional view of a state-of-the-art torque transmitting device.
Figure 2:
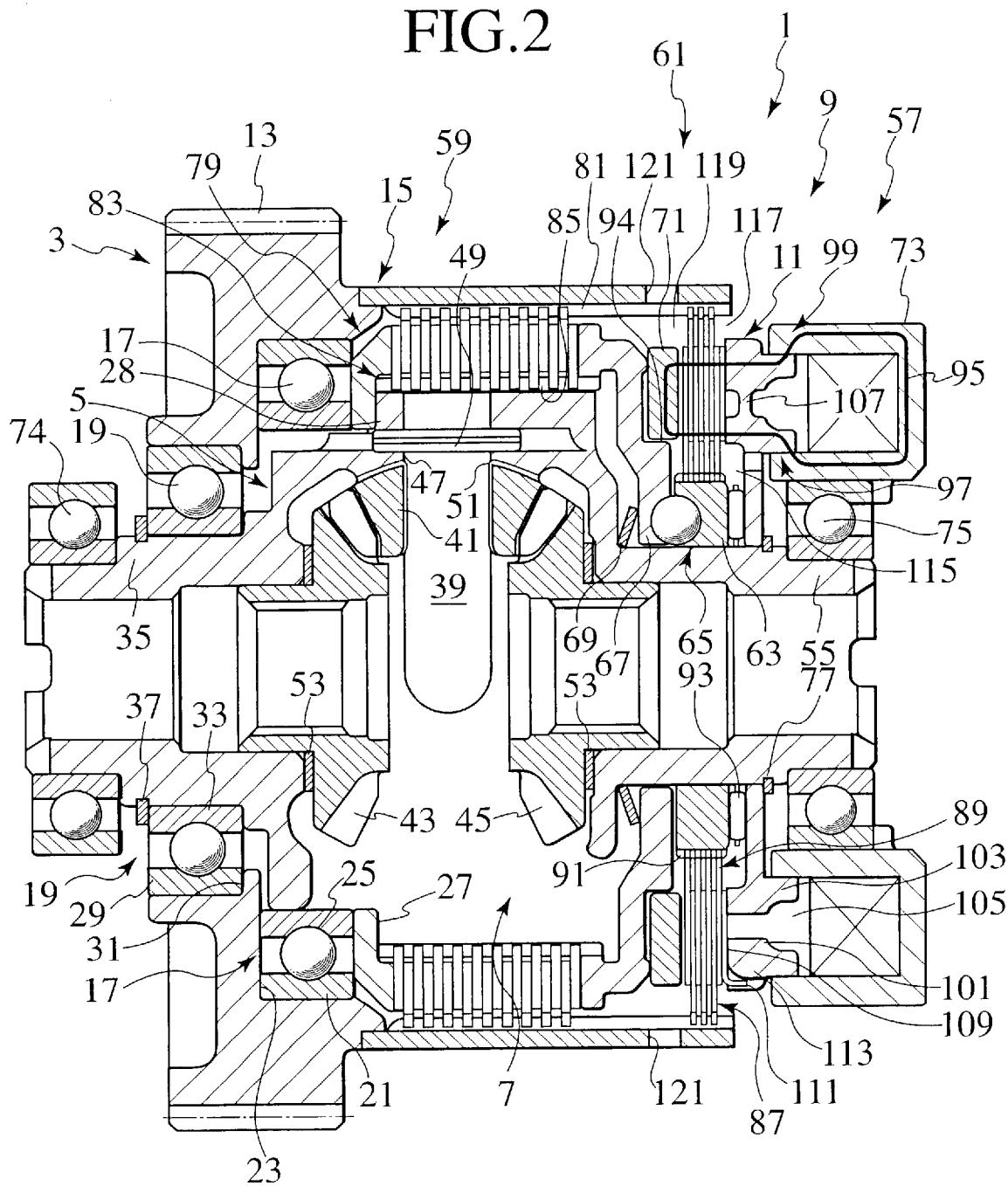
FIG. 2 is a cross sectional view of a rear differential device incorporating a wet type friction clutch of a first preferred embodiment according to the present invention.

The terminology "right and left direction" refers to a right and left direction of a vehicle in FIG. 2, with the vehicle rear differential 1 being mounted therein, and component parts with no respective reference numerals represent that these component parts are not shown.

While the vehicle rear differential 1 of FIG. 2 is described in conjunction with an example of a structure including a wet type friction clutch and applied to a four wheel drive vehicle with the rear differential 1 being mounted at a rear wheel side to permit rear wheels to be disconnected from a transmission output shaft during a two wheel drive running mode, the present invention is not limited thereto and it is to be noted that the inner plate and the outer plate of the preferred embodiments may also be applied to other wet-type friction clutches.

In FIG. 2, the vehicle rear differential 1 is shown as having a rotary case 3, a differential case 5, a beveled gear type differential gear mechanism 7 and an electromagnetic clutch including a clutch mechanism 9 having a rotor 11.

The vehicle rear differential 1 is accommodated in a differential carrier, which is formed with an oil sump.

The rotary case 3 is comprised of a ring gear 13 and a cylindrical member 15, with the cylindrical member 15 being fabricated by press forming and connected to the rig gear 13 by welding.

The ring gear 13 is supported with the differential case 5 by means of larger and smaller diameter ball bearings 17, 19. The ring gear 13 includes a helical gear, which meshes with an associated helical gear connected to a rear wheel side propeller shaft.

As shown in FIG. 2, the rotary case 3 functions to deliver an output torque via the ring gear 13 in a floating structure that is free from supporting functions for related component parts.

Further, the ring gear 13 provides a rightward meshing thrust force to the rotary case 3 during a forward running mode of the vehicle while providing a leftward meshing thrust force to the rotary case 3 during a rearward running mode of the vehicle.

The ball bearing 17 includes an outer race 21 that is positioned in a leftward direction with a stepped portion 23 of the ring gear 13, whereas an inner race 25 is positioned in a rightward direction with a pressure receiver plate 27 and a stepped portion 28 of the differential case 5.

Furthermore, an outer race 29 of the ball bearing 19 is positioned in a rightward direction with a stepped portion 31 of the ring gear 13, whereas an inner race 33 is positioned in a leftward direction with a snap ring 37 fixed to a left boss portion 35 of the differential case 5. The snap ring 37 has a suitable strength to provide a sufficient positioning capability.

The differential gear mechanism 7 is comprised of a plurality of pinion shafts 39, pinions 41 and left and right side gears 43, 45.

The pinion shafts 39 are positioned so as to extend in radial directions from a rotating central axis of the differential case 5, with respective distal ends engaging associated mating bores 47 of the differential case 5 and being locked with a spring pin 49.

The pinion gear 41 is supported on the pinion shaft 39, and a spherical washer 51 is disposed between the differential case 5 and the pinion gear 41 such that it is exerted with a centrifugal force of the pinion 41 and a reaction force arising from meshing engagement between the side gears 43, 45.

The side gears 43, 45 meshes with the associated pinion gears 41, respectively, and thrust washers 53 are disposed between the side gears 43, 45 and the differential case 5, respectively, to resist meshing reaction forces caused by the side gears 43, 45.

The side gears 43, 45 are coupled to left and right drive shafts, respectively, through spline connection, with the respective drive shafts extending through the left and right boss portions 35, 55 and through the differential carrier to outside to be connected to left and right rear drive wheels via associated coupling units.

The differential case 5 is so configured as to permit the left boss portion 35 to be supported with the differential carrier through a ball bearing 74 and the right boss portion 55 to be supported with the differential carrier through a ball bearing 75.

A drive power output of an engine (prime mover) to rotate the ring gear 13 is transferred to the differential case 5 in a manner described below when the clutch mechanism 9 is coupled. Rotation of the differential case 5 is transferred to the side gears 43, 45 from the pinion shafts 39 through the associated pinion gears 41, whereupon the drive power outputs are transferred to the left and right rear wheels via the respective drive shafts in a four wheel drive condition, with a remarkable improvement in a rough-road escaping capability and a rough-road covering property, a start up property, an accelerating property and a vehicle stability.

Further, when encountered with a differential driving resistance between the rear wheels at the rough-road, the drive power output of the engine is differentially distributed between the left and right rear wheels due to rotations of the pinion gears 41.

The electromagnetic clutch, which forms the clutch mechanism 9, is comprised of a clutch operator composed of an electromagnet 57, a rotor 11, a multi-plate type main clutch 59, a pilot clutch (which forms a wet type friction clutch of the preferred embodiment according to the present invention) 61, a cam ring or a circular plate member 63, ball cams or rolling members (which form a cam mechanism) 65, a pressure plate 67, a return spring 69, an armature 71 and a controller.

A core 73 of the electromagnet 57 is fixedly secured to the differential carrier, with wire leads being connected to a battery pack installed on the vehicle.

The rotor 11 is made of magnetic material and is fixed to an outer periphery of the right boss portion 55 of the differential case to be positioned in an axial direction by means of a snap ring 77. Also, the rotor 11 serves as a right side wall member of the rotary case 3.

The main clutch 59 is disposed between the rotary case (the cylindrical member 15) 3 and the differential case 5. Outer plates 79 of the main clutch 59 are coupled to a spline portion 81 formed at an inner periphery of the cylindrical member 15, and inner plates 83 are coupled to a spline portion 85 formed at an outer periphery of the differential case 5.

The pilot clutch 61 is disposed between the cylindrical member 15 and the cam ring 63. A first plurality of outer plates (clutch plates) 87 are coupled to the spline portion 81 of the cylindrical member 15, and a second plurality of inner plates (clutch plates) 89 are coupled to a spline portion 91 formed at an outer periphery of the cam ring 63.

Further, the spline portion 81 is formed when press forming the cylindrical member 15 such that spline teeth extend throughout the cylindrical member 15 to terminate at a right distal end thereof.

The outer plates 87 and the inner plates 89 are alternately interleaved in the axial direction such that the inner plates 89 opposes the armature 71.

The ball cam 65 is disposed between the cam ring 63 and the pressure plate 67. The pressure plate 67 is coupled to the spline portion 85 of the differential case 5 and responds to the cam thrust force exerted by the ball cam 65 to urge the main clutch 59 into a coupling state in a manner as will be described below, Located between the cam ring 63 and the rotor 11 is a thrust bearing which resists the cam reaction force exerted by the ball cam 65.

Also disposed between the pressure plate 67 and the differential case 5 is a return spring 69 that biases the pressure plate 67 in a direction to uncouple the main clutch 59.

The armature ring 71 is formed in a ring shape and is disposed between the pressure plate 67 and the pilot clutch 61 for free movement in the axial direction. Further, An inner periphery of the armature 71 is centered with a stepped portion 94 of the pressure plate 67.

The rotor 11, the outer plates 87 and the inner plates 89 of the pilot clutch 61 and the armature 71 form a magnetic flux path of the electromagnet 57 such that, when the electromagnet 57 is energized, a magnetic flux loop 95 is formed on the magnetic flux path.

Further, air gaps 97, 99 with given distances which form a part of magnetic flux path are provided between the rotor 11 and the core 73 of the electromagnet 57. The rotor 11 is comprised of an outer peripheral portion 101 and an inner peripheral portion 103 which are spaced in a radial direction and which are interconnected with one another by means of a bridge portion 107. In order for the bridge portion 107 to have an increased magnetic flux short-circuit preventing effect, the bridge portion has both sides formed with concave portions to provide a thinned thickness.

Furthermore, disposed between the rotor 11 and the pilot clutch 61 is a washer 109 that provides an improved abutting engagement between the pilot clutch 61 and the rotor 11. The washer 109 has three claws 111 folded into associated concave portions 113 formed on the outer periphery of the rotor 11 to be fixedly mounted thereto.

Moreover, a gap or spacing 115 is provided between the inner periphery of the outer plate 87, of the pilot clutch 61, and the cam ring 63; a spacing 117 is provided between the outer periphery of the inner plate 89 and the rotary case 3; and a spacing 119 is provided between the rotary case 3 and the outer periphery of the armature 71, with the spacing 115, 117, 119 being operative to further improve the magnetic flux short-circuit preventing effect. These spacing 115, 117, 119 serve as oil chambers or oil flow passages to provide improved lubricating and coolant properties for the pilot clutch 61, the ball cam 65 and the main clutch, etc.

Thus, the electromagnet 57, the pilot clutch 61 and the armature 71 form the electromagnetic clutch of the preferred embodiment.

The pilot clutch 61 is structured with three pieces of outer plates 87 and four pieces of inner plate 89 which are alternately interleaved in a laminated structure that is located between the rotor (electromagnet 57) 11 and the armature 71. This allows the pilot clutch 61 to be kept between the electromagnet 57 and the armature 71. In this connection, the outer plates 87 and the inner plates 89 are laminated for sliding movement with respect to one another.

As shown in FIGS. 3A and 3B and FIGS. 4 and 5, the outer plate 87 includes a disk whose outer periphery is formed with a plurality of circumferentially spaced engagement protrusions 88 which engage the spline portion 81, whereas the inner plate 89 has an inner periphery formed with a plurality of circumferentially spaced engagement protrusions 92 which engage the spline portion 91 of the cam ring 63.

Figure 3A:
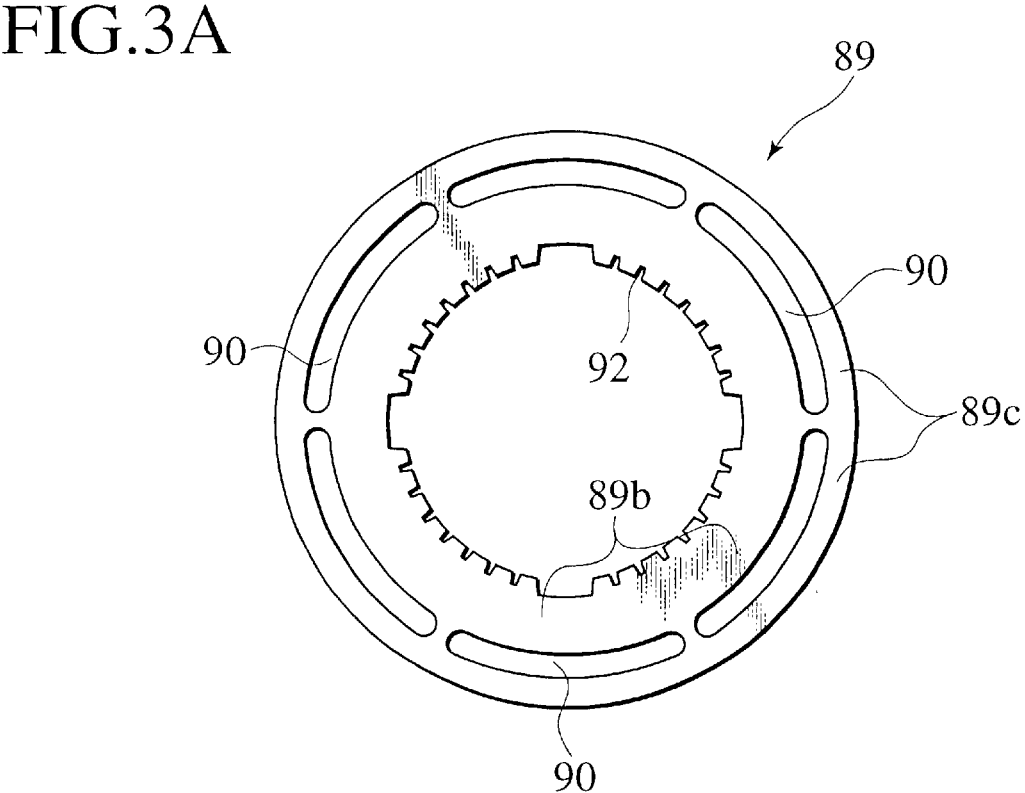
FIG. 3A is a front view of an inner plate of the first preferred embodiment according to the present invention.
Figure 3B:
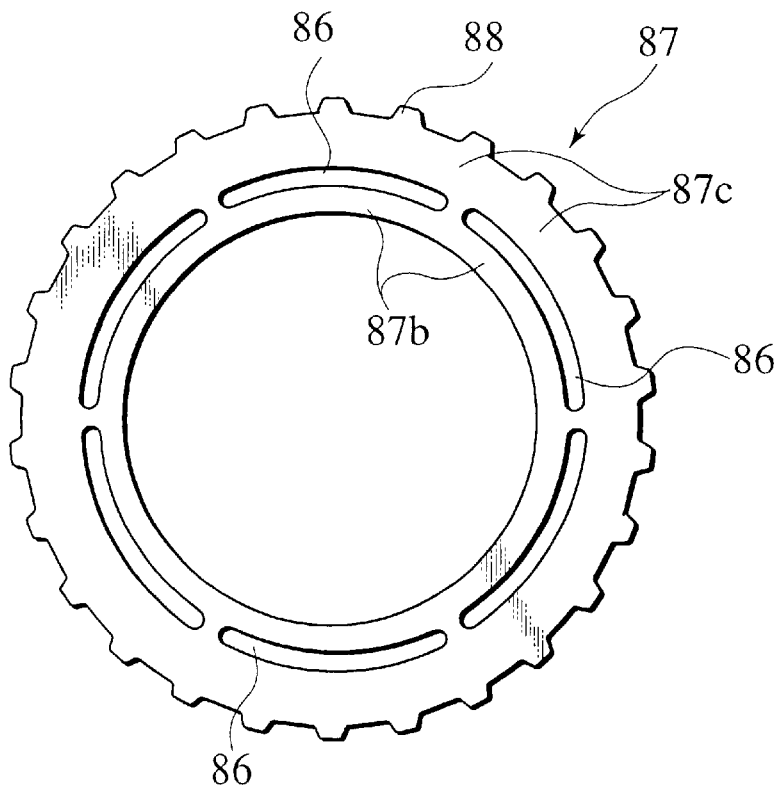
FIG. 3B is a front view of an outer plate of the first preferred embodiment according to the present invention.
Figure 4:
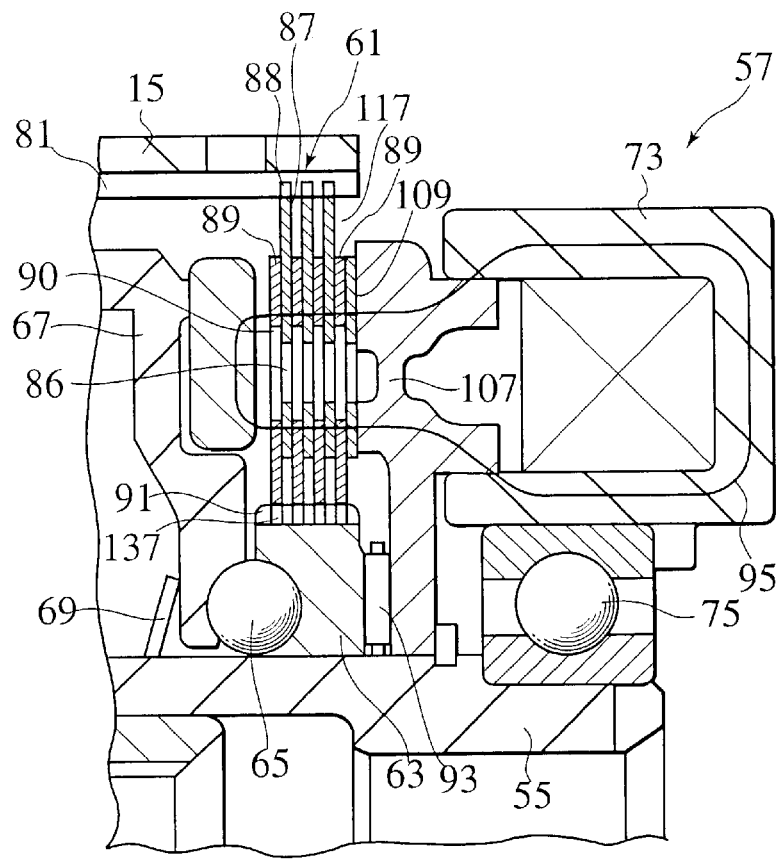
FIG. 4 is an enlarged cross sectional view illustrating principal parts of a pilot clutch incorporating the inner plate and the outer plate of the first preferred embodiment according to the present invention.
Figure 5:
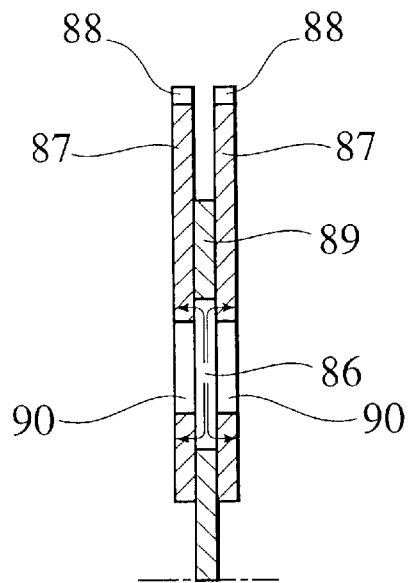
FIG. 5 is an exploded cross sectional view of the pilot clutch shown in FIG. 4.

As shown in FIGS. 3A and 3B, further, the inner plate 89 and the outer plate 87 include inner peripheral magnetic flux path forming portions 89b, 87b and outer peripheral magnetic flux path forming portions 89c, 87c, respectively, and pluralities of oil guide passageways 90, 86 formed between the inner peripheral magnetic flux path forming portions 89b, 87b and the outer peripheral magnetic flux path forming portions 89c, 87c, respectively, to also serve as air gaps as will be described below. The oil guide passageways 90, 86 have circular arc shapes that extend in a peripheral direction in respective given distances and are formed in the outer plate 87 and the inner plate 89 along the respective peripheral directions at given distances.

The oil guide passageways 86, 90 are formed by blanking the outer plate 87 and the inner plate 89 in circular arc shapes along a thickness direction, with the oil guide passageways 86, 90 per se also serving as gaps for preventing short-circuiting of the magnetic flux path. The presence of the oil guide passageways 86, 90 that function as the gaps for the magnetic flux enables the magnetic flux of the electromagnet 57 to be remarkably enhanced, with a resultant capability for the electromagnet 57 to couple the pilot clutch 61 in a highly reliable manner.

The oil guide passageways 86, 90 have substantially equal length in a rotational direction (circumferential direction) such that the pilot clutch 61 is assembled to allow the outer plates 87 and the inner plates 89 to be alternately interleaved so as to permit the oil guide passageways 86, 90 to face one another among the adjacent clutch plates. Accordingly, among the adjacent clutch plates, the oil guide passageways 86, 90 are axially aligned with respect to one another to be brought into communication. This results in a capability for the oil to flow in or flow out among the adjacent clutch plates in a smooth manner to achieve a smooth coupling or uncoupling of the clutch.

In FIGS. 2A and 2B, when forming the outer plate 87 and the inner plate 89, the oil guide passageway 90 of the inner plate 89 is formed so as to have a larger width (in other words, the length in a radial direction) than that of the oil guide passageway 86 of the outer plate 87 such that the oil guide passageway 86 of the outer plate 87 is different in surface (volume) from the oil guide passageway 90 of the inner plate 89. When hydrodynamic pressure is created due to the "Weissenberg Effect" with rotation of the pilot clutch 61, the oil introduced into the guide passageways 86, 90 have a tendency that the oil flows out from the oil guide passageway 90 of the inner plate 89 with the larger volume at a larger flow rate than that of the oil flowing out from the oil guide passageway 86 of the outer plate 87 (due to the hydrodynamic pressure effect). Owing to this hydrodynamic pressure effect, the outer plate 87 and the inner plate 89 are separated from one another. As a result, it is possible to limit the drag torque that would be caused between the outer plate 87 and the inner plate 89.

The controller is arranged to have a circuitry for controlling excitation of the electromagnet 57, excitation current of the electromagnet and interruption of exciting the electromagnet in dependence on a road surface condition, running conditions such as start-up, acceleration and turning of the vehicle, and steering conditions.

When the electromagnet 57 is energized, the armature 71 is attracted such that the pilot clutch 61 is coupled between the armature 71 and the rotor 11.

As the pilot clutch 61 is coupled, due to the pilot clutch 61, the ball cam 65 composed of the rolling members is exerted with the drive power output of the engine via the cam ring 63, composed of the circular member coupled to the rotary case 3, and the pressure plate 67 coupled to the differential case 5. The ball cam 65 functions to amplify and convert this drive power output into a cam thrust force by which the pressure plate 67 is moved to cause the main clutch 59 to be urged toward the pressure receiving member 27 to be brought into a coupled condition.

Thus, as the clutch mechanism 9 is coupled, rotation of the ring gear 13 is transferred to the differential case 5, whose rotation is distributed to the left and right rear wheels by the differential gear mechanism 7 such that the vehicle is brought into the four wheel drive condition.

When this occurs, if the excitation current of the electromagnet 57 is controlled, the degree of slippage of the pilot clutch 61 is varied to vary the cam thrust force provided by the ball cam 65 for thereby controlling the drive power output to be delivered to the rear wheels.

Also, it is to be noted that the terminology "control" involves operations for turning the electric current ON or OFF so as to couple or uncouple the clutch, or for consecutively turning a given voltage ON or OFF.

If such a control of the drive power output is executed during turning operation of the vehicle, it is possible for the vehicle to have a highly improved turning capability and stability of the vehicle body.

Further, if the electromagnet 57 is de-energized, the pilot clutch 61 is uncoupled to loose the cam thrust force of the ball cam 65 to permit the pressure plate 67 to restore its rightmost position due to the urging force of the return spring 69. When this takes place, the main clutch 59 is uncoupled and the clutch mechanism 9 is also uncoupled, with a resultant two wheel drive condition of the vehicle whose front wheels are driven.

Inner peripheries of the boss portions 35, 55, of the differential case 5, through which the left and right drive shafts extend, respectively, are formed with spiral oil recesses. Further, the differential case 5 has a large number of openings formed at areas corresponding to the main clutch 59, and the rotary case 3 is also formed with openings 121, 121 at areas corresponding to the pilot clutch 61.

Furthermore, the spaces 115, 117, 119 serving as the oil chambers are provided in areas close proximity to the pilot clutch 61, which is located at the right distal end of the rotary case 3 (cylindrical member 15) and the armature 71.

A lower portion of the rotary case 3 is immersed in the oil sump located in the differential carrier to allow the oil to flow through the spaces 115, 117, 119, which serves as the oil chambers, into the pilot clutch 61, the sliding areas between the armature 71 and the pressure plate 67, the ball cam 65, thrust bearing 93, the main clutch 59 and the ball bearing 17, all of which are consequently lubricated and cooled.

Moreover, the oil is caused to flow inside along the spiral oil recess during rotation of the differential case 5 for lubricating and cooling meshing areas of associated gears of the differential gear mechanism 7 and the spherical washer 51 and, when subjected to the centrifugal force, the oil flows out through the above described openings toward the main clutch 59 to lubricate and cool the main clutch 59, the ball bearing 17, the ball cam 65, the pilot clutch 61 and the thrust bearing 93 whereupon the oil flows out through the spaces 115, 117, 119 and the openings 121, 121 and returns to the oil sump.

In addition, the ball bearings 17, 19 are also lubricated and cooled with the oil splashed during rotation of the ring gear 13.

Further, the electromagnet 57 is cooled with the oil to provide a stabilized characteristic, with the oil in the sump and the peripheral pilot clutch 61 and the ball cam 65 being heated to allow the heated oil to be circulated for thereby warming the above described components parts to provide their respective stabilized functions.

Between the engine and the rear differential device 1, there is an emergency function such that, even when seizing takes place in the gear box or the bearings, the ring gear 13 of the rotary case 3 encounters a preceding rotation with respect to the associated helical gear.

Under such a condition, since the direction in which the torque is transferred to between the ring gear 13 and the associated helical gear is aligned in the same direction as the backward travel, as previously set force, the meshing engagement of the helical gear provides a thrust force that tends to move the rotary case 3 leftward.

Further, set forth above, since the snap ring 37, which functions to position the ball bearing 19, is adjusted to have a suitably selected strength, undergoes the thrust force via the ball bearing 19, the snap ring 37 is caused to rupture, causing the rotary case 3 to move leftward whereby the outer plates 87 of the pilot clutch 61 come off from the spline portion 81 of the cylindrical member 15.

As the outer plates 87 come off from the spline portion 81, the cam thrust force of the ball cam 65 disappears as in the released state of the pilot clutch 61 to release the main clutch 59 for separating the rear wheels from the power drive transfer line.

Accordingly, even when the vehicle encounters a trouble at the input side during traveling under the four wheel drive condition, the rear wheels are automatically disconnected, resulting in an improvement in a trouble mode.

Furthermore, when the clutch mechanism 9 remains in its released condition (two wheel drive condition), the inner plates 89 of the pilot clutch 61, the pressure plate 67, the armature 71, the cam ring 63 (ball cam 65), the thrust bearing 93 and the rotor 11 rotate with the differential case 5, and the outer plates 87 of the pilot clutch 61 rotates with the rotary case 3.

With such a structure, when the outer plates 87 are disposed in opposed relationship with the armature 71, the torque is transferred from the outer plates 87 to the armature 71 due to friction during traveling under the two wheel drive condition, resulting in accompanied rotations of the rear wheels to encounter a loss of drive power which adversely affects the fuel consumption of the engine. However, with the rear differential 1 set forth above, since the inner plates 89 of the pilot clutch 61 are disposed in opposed relationship with the armature 71 to interrupt the transfer of drive power caused by friction, the accompanied rotations of the rear wheels are effectively prevented to eliminate the adverse affect on the fuel consumption due to the drive power loss.

Moreover, with the rotor 11 supported on the rotary case 3, the thrust bearing 93 is exerted with relative rotation between the cam ring 63 of the differential case 5 and the rotor 11 of the rotary case 3 during the two wheel drive traveling condition, whereas, with the rear differential 1 in which the rotor 11 is supported on the differential case 5, the thrust bearing 93 is rendered to be free from such a relative rotation for thereby improving the durability.

Thus, the rear differential 1 is structured in a manner described above.

As set forth above, with the pilot clutch 61, since the oil guide passageway 90 of the inner plate 89 has a larger width than that of the oil guide passageway 86 of the outer plate 87 to have a larger volume, a hydrodynamic pressure effect of oil is created between the outer plate 87 and the inner plate 89. This hydrodynamic pressure effect provides a capability of limiting the drag torque that would be caused between the outer plates 87 and the inner plates 89.

Since the drag torque is enabled to be limited, there is no danger for the pilot clutch 61 to produce a pilot torque, thus providing a capability of precluding the main clutch 59 from being undesirably coupled via the ball cam 65 owing to the pilot torque. The absence of such undesired uncoupling of the main clutch 59 provides no danger of inducing the four wheel drive condition during the two wheel drive condition. As a result, the vehicle has a stabled traveling property and is able to eliminate the drive power loss to improve the fuel consumption.

Further, since the oil guide passageways 86, 90 form the gap portions of the outer plate 87 and the inner plate 89, respectively, there is no need for the oil guide passageways 86, 90 and the gap portions to be separately formed, providing the clutch plate with a simplified structure.

Furthermore, with such a rate in which there is no need for separately forming the oil guide passageways 86, 90 and the gap portions, magnetic flux surface areas of the outer plate 87 and the inner plate 89 can be enhanced. This results in an increased amount of magnetic flux to couple the pilot clutch 61, which is consequently coupled in a preferable fashion.

Moreover, with such a rate in which the magnetic flux surfaces are ensured, it is possible to reduce the size of the electromagnet 57 and the associated power supply (battery), with an improved vehicle installation availability.

While, in the preferred embodiment discussed above, the present invention has been described with reference to an example in which the oil guide passageway 90 of the inner plate 89 is formed to have a larger width than that of the oil guide passageway 86 of the outer plate 87 to provide an increased volume (surface area), it is needless to say that the oil guide passageway 86 of the outer plate 87 may be formed to have a larger width than the oil guide passageway 90 of the inner plate 89 with a similar function and advantage.

Second Preferred Embodiment

A second preferred embodiment of an outer plate is described below in conjunction with FIGS. 6 and 7. The outer plate 87A of the second preferred embodiment is identical with that of the first preferred embodiment except for an oil guide passageway 98, and the same parts bear the same reference numerals as those used in the first preferred embodiments to omit redundant description.

Figure 6:
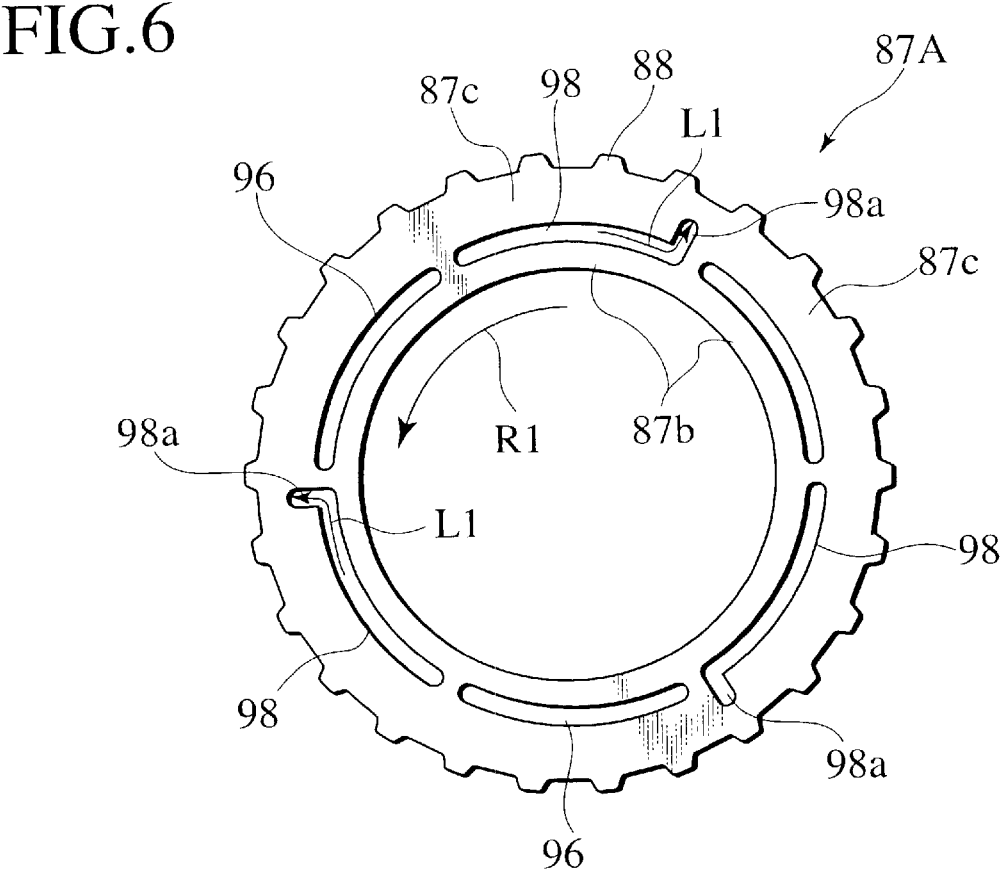
FIG. 6 is a front view of an outer plate of a second preferred embodiment according to the present invention.
Figure 7:
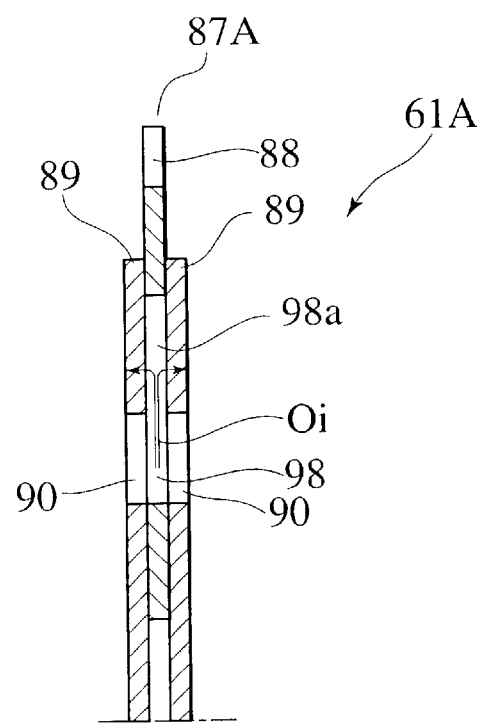
FIG. 7 is a cross sectional view of the principal parts illustrating the relationship between the outer plate of FIG. 6 and the inner plate of FIG. 3A.

FIGS. 6 and 7 show the outer plate 87A of the pilot clutch 61, with an outer periphery of the outer plate 87A being formed with a plurality of circumferentially spaced engaging protrusions 88 that mesh with the spline portion 81 of the cylindrical member 15. Also, the pilot clutch 61 employs the same inner plate 89 as that of the first preferred embodiment.

As shown in FIG. 6, the outer plate 87A is formed with a plurality of oil guide passageways 96, 98 which are alternately spaced from one another in a circumferential direction and each of which has a given length. The oil guide passageways 96, 98 also serve as gap portions that form the magnetic flux path of the electromagnet 57 (see FIG. 2) and have capabilities of enhancing the magnetic flux path of the electromagnet 57.

The oil guide passageway 98 is formed between lie adjacent oil guide passageways 96, 96, each of which has a circular arc shape similar to the oil guide passageway 90 of the inner plate 89. On the contrary, the oil guide passageway 98 includes a circular arc recess, and an extending portion 98a formed at one end of the circular arc recess and radially extending outward.

In particular, the extending portion 98a of the oil guide passageway 98 is formed at a trailing edge of the circular arc recess with respect to the rotational direction R1 of the outer plate 87 such that an upper edge of the extending portion 98a extends toward a region outside the area, in which the oil guide passageway 90 of the inner plate 90 is formed, and terminates at an outer periphery magnetic path forming portion 87c. Thus, the oil guide passageway 98 is formed to have a shape different from that of the oil guide passageway 90 of the inner plate 89.

As shown in FIG. 7, assembling the outer plate 87A so as to be interleaved with the inner plates 89 of the first preferred embodiment forms the pilot clutch 61A. In this instance, the outer plate 87A and the inner plate 89 are interleaved such that the oil guide passageways 90, 90, 96, 98 are axially aligned to communicate with one another. Under such a laminated condition, if differential rotations exist between the outer plate 87A and the inner plate 89 due to rotation of the outer plate 87A in a direction as shown by an arrow R1 owing to the rotation of the cylindrical member 15, the oil remaining in the oil guide passageways 96, 98 flows in a direction as shown by an arrow L1 (see FIG. 6) opposite to the direction of arrow R1 due to the hydrodynamic pressure effect. Also, this flow of oil is further enhanced with a centrifugal force due to rotation of the outer plate 7A.

Since the oil guide passageway 98 is formed with the expanded portion 98a at the trailing edge of the circular arc recess in the direction of the arrow L1, the oil flows into the extending portion 98a during rotation of the outer plate 87A. The oil flowing into the extending portion 98a flows toward adjacent surfaces of the inner plates 89 as shown by an arrow $O_i$ in FIG. 7 and, hence, the inner plates 89 encounter actions (hydrodynamic pressure effects) such that they are forced out. As such, the inner plates 89 are separated from the outer plate 87A. Thus, it is possible to limit the drag torque between the outer plate 87A and the inner plate 89.

Also, while the second preferred embodiment has been described with reference to an example in which the oil guide passageway 98 of the outer plate 87A is formed with the extending portion 98a, the oil guide passageway 90 of the inner plate 89 may have the similar extending portion 98a with a similar function and advantage.

Third Preferred Embodiment

An inner plate 89A of a third preferred embodiment is described below with reference to FIG. 8. The inner plate 89A of the third preferred embodiment is identical with that of the first preferred embodiment except for an oil guide passageway 100, and the same parts bear the same reference numerals as those used in the first preferred embodiment to omit redundant description.

Figure 8:
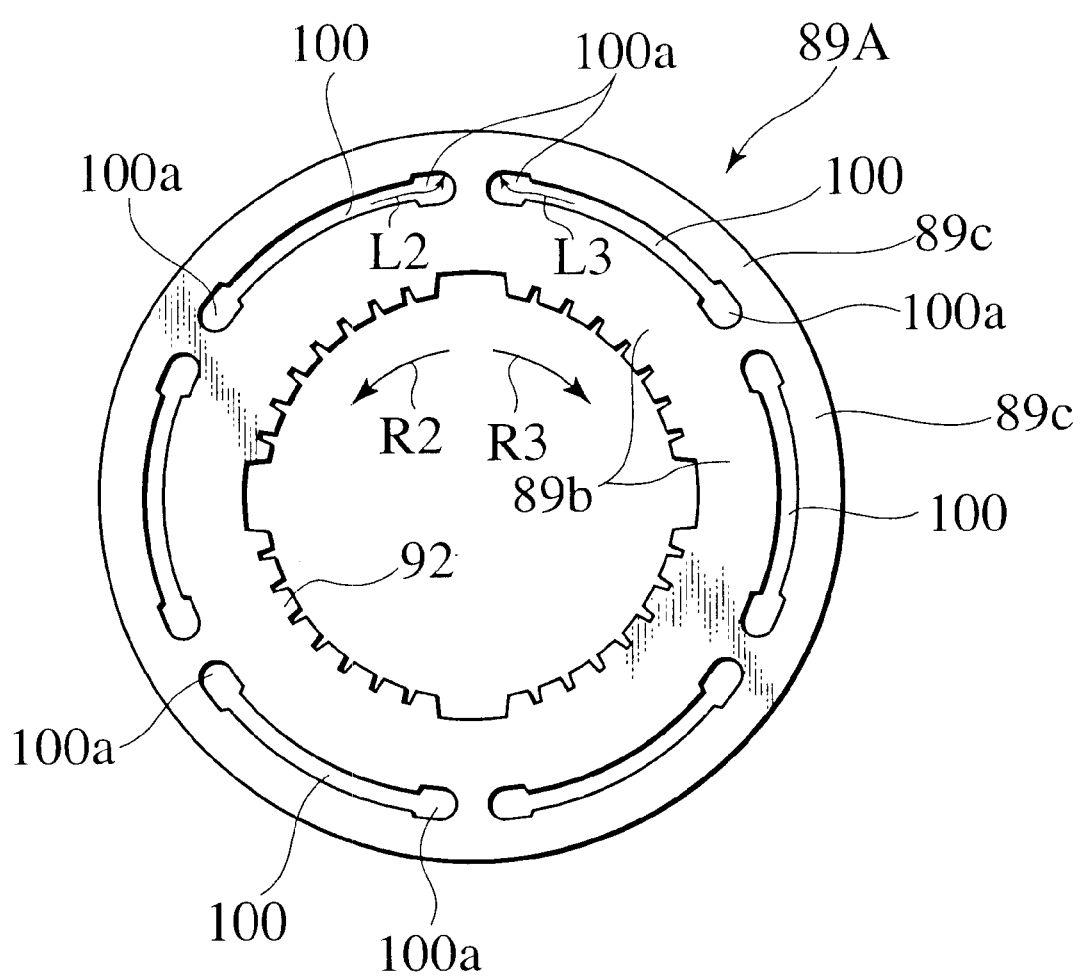
FIG. 8 is a front view of an inner plate of a third preferred embodiment according to the present invention.

FIG. 8 shows the inner plate 89A of the pilot clutch 61, with an inner periphery of the inner plate 89A being formed with a plurality of circumferentially spaced engaging protrusions 92 that mesh with the spline portion 91 of the cam ring 63. Also, the pilot clutch 61 employs the same outer plate 87 as that (provided that the width of the oil guide passageway 86 is substantially equal to that of the oil guide passageway 100 of the inner plate 89A) of the first preferred embodiment shown in FIG. 3B.

As shown in FIG. 8, the inner plate 89A is formed with a plurality of oil guide passageways 100 that are spaced from one another in a circumferential direction and each of which has a given length. The oil guide passageways 100 have circular arc shapes, respectively, along an outer periphery of the inner plate 89A, and each of the oil guide passageways 100 has both lengthwise ends formed with expanded portions 100a. Each expanded portion 100a has a larger width than that of an intermediate portion of the oil guide passageway 100.

Laminating the inner plate 89A and the outer plate 87 forms the pilot clutch 61. Accordingly, the oil guide passageway 100 of the inner plate 89A and the oil guide passageway 86 of the outer plate 87 are laminated to be in axial communication with respect to one another, and the oil passageways 100 and 86 also serve as the gaps for precluding the short-circuiting of the magnetic flux of the electromagnet 57.

In the presently filed preferred embodiment, if the outer plate 87 and the inner plate 89A begin to rotate, owing to the presence of the expanded portions 100*a* formed at the both ends of the oil guide passageway 100 of the inner plate 89A, the hydrodynamic pressure effect is created between the outer plate 87 and the inner plate 89A. Due to the hydrodynamic pressure effect, and outer plate 87 and the inner plate 89A are separated from one another, with a resultant limited drag torque caused between the outer plate 87 and the inner plate 89A.

Also, while the third preferred embodiment has been described with reference to an example in which the oil guide passageway 100 of the inner plate 89A has both ends formed with the expanded portion 100*a*, the oil guide passageway 86 of the outer plate 87 may have the similar expanded portion with a similar function and advantage.

Fourth Preferred Embodiment

An inner plate 89B of a fourth preferred embodiment is described below with reference to FIG. 9 and FIGS. 10A and 10B. The inner plate 89B of the fourth preferred embodiment is identical with that of the first preferred embodiment except for an oil guide passageway 102, and the same parts bear the same reference numerals as those used in the first preferred embodiment to omit redundant description.

Figure 9:
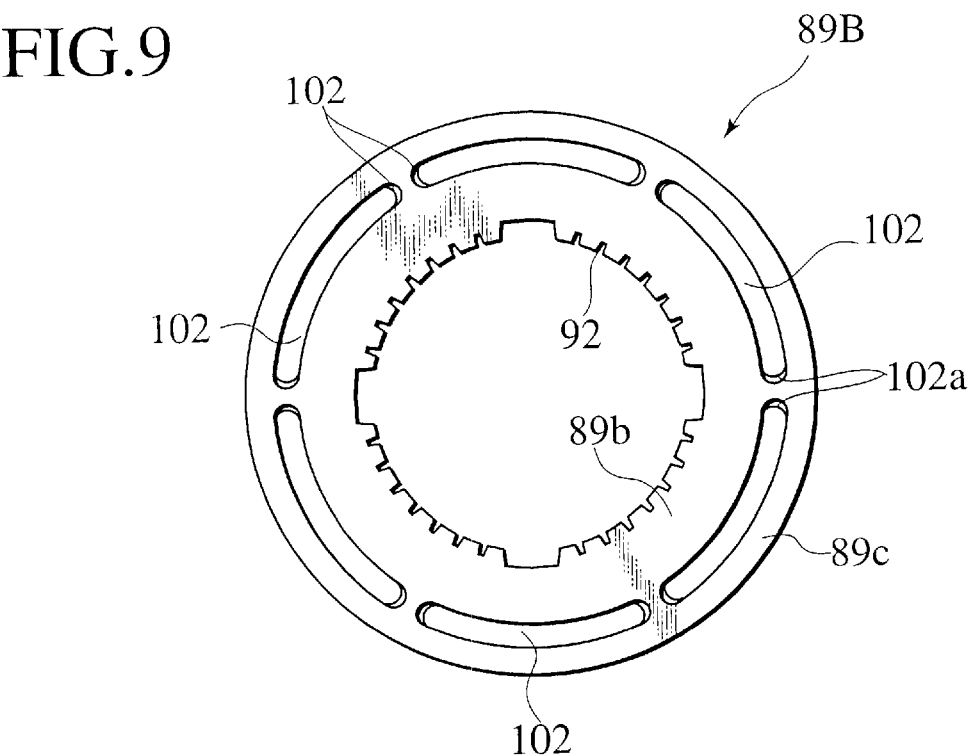
FIG. 9 is a front view of an inner plate of a fourth preferred embodiment according to the present invention.
Figure 10A:
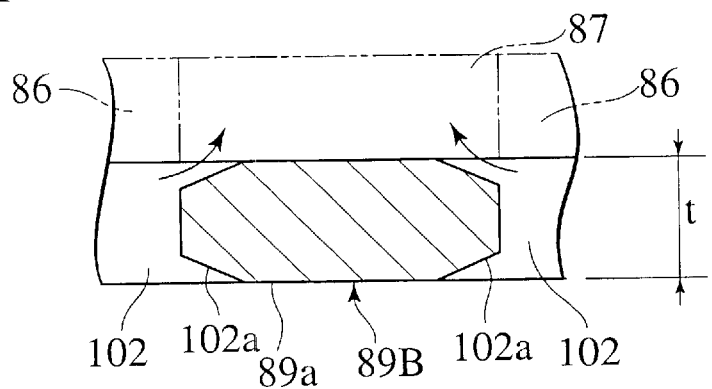
FIG. 10A is an enlarged cross sectional view illustrating an essential part of the inner plate shown in FIG. 9.
Figure 10B:
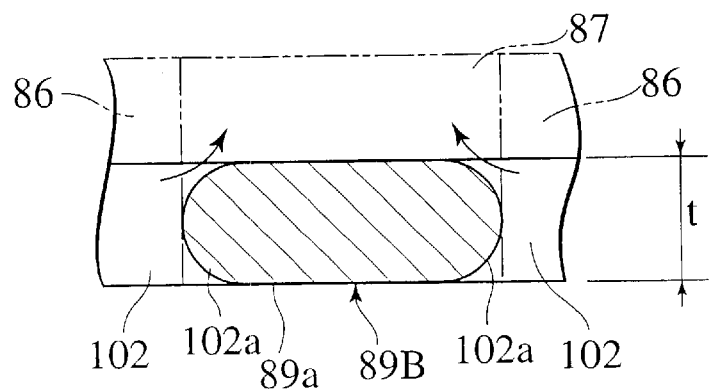
FIG. 10B is an enlarged cross sectional view illustrating an essential part of a modified form of the inner plate shown in FIG. 9.

FIG. 9 and FIGS. 10A and 10B illustrate the inner plate 89B of the pilot clutch 61, with an inner periphery of the inner plate 89B being formed with a plurality of circumferentially spaced engaging protrusions 92 that mesh with the spline portion 91 of the cam ring 63. Also, the pilot clutch 61 employs the same outer plate 87 as that (provided that the width of the oil guide passageway 86 is substantially equal to that of the oil guide passageway 102 of the inner plate 89B) of the first preferred embodiment.

The inner plate 89B is formed with a plurality of oil guide passageways 102 that are spaced from one another in a circumferential direction and each of which has a given length. The oil guide passageways 102 have circular arc shapes, respectively, along an outer periphery of the inner plate 89B, and each of the oil guide passageways 102 has both lengthwise ends formed with edge portions 102*a* less in thickness than a plate thickness t of a body of the inner plate 89B.

In particular, as shown in FIGS. 10A and 10B, the edge portions 102*a*, 102*a*' of the oil guide passageways 102 are formed to have a thinned thickness less in thickness than the plate thickness t of the body of the inner plate 89B such that clearances are defined relative to the adjacent outer plates 87. Thus, the formation of the clearances between the edge portions 102*a*, 102*a*', of the oil guide passageway 102, and the adjacent outer plates 87, 87 enables the oil to remain in these clearances. Under this state, if the outer plate 87 and the inner plate 89*b* begin to rotate, the hydrodynamic pressure is created to produce the hydrodynamic pressure effect by which the oil is introduced into between the inner plate 89B and the outer plate 87.

In FIG. 10A, also, the edge 102*a* of the oil guide passageway 102 and the outer surface 89*a* of the inner plate 89B is contiguous with an inclined wall portion. This causes the oil to flow along this inclined wall portion to enter the clearances between the outer plate 87 and the inner plate 89B, providing a capability of smoothly introducing the oil to the associated sliding areas between the inner plate 89B ad the outer plate 87 for thereby enabling the drag torque to be limited.

On the other hand, FIG. 10B illustrates an alternate example of the edge portion 102*a*, wherein the edge portions 102*a*', 102*a*' of the oil guide passageway 102 have arcuate cross sections, respectively. With the structure shown in FIG. 10B, the presence of the edge portions 102*a*' with the arcuate cross sections compels the oil to smoothly flow like in the structure of FIG. 10A. As a result, it is possible for the oil to be smoothly introduced to the associated sliding areas between the inner plate 89B and the outer plate 87, thereby providing a limited drag torque.

Laminating the inner plates 89B and the outer plates 87 forms the pilot clutch 61. In this connection, the oil guide passageway 102 of the inner plate 89B and the oil guide passageway 86 of the outer plate 87 are different in shape and volume (surface area). Lamination of these components are carried out so as to provide axial communication between the oil guide passageway 102 of the inner plate 102 and the oil guide passageway 86 of the outer plate 87, and the oil passageways 102 and 86 also serve as the gaps for precluding the short-circuiting of the magnetic flux of the electromagnet 57.

In the presently filed preferred embodiment, consequently, if the outer plate 87 and the inner plate 89B begin to rotate, owing to the presence of the edge portions 102*a*, 102*a*' formed at the both ends of the oil guide passageway 102 of the inner plate 89B and each having a thickness less than the body of the inner plate 89B, the hydrodynamic pressure effect is created between the outer plate 87 and the inner plate 89B. Due to the hydrodynamic pressure effect, and outer plate 87 and the inner plate 89B are separated from one another, with a resultant limited drag torque caused between the outer plate 87 and the inner plate 89B.

Also, while the fourth preferred embodiment has been described with reference to an example in which the oil guide passageway 102 of the inner plate 89B has both ends formed with the edge portions 102*a* which are less in thickness than the plate thickness t of the body of the inner plate 89B, the oil guide passageway 86 of the outer plate 87 may have both ends formed with the similar edge portions with a similar function and advantage.

Fifth Preferred Embodiment

Figure 11:
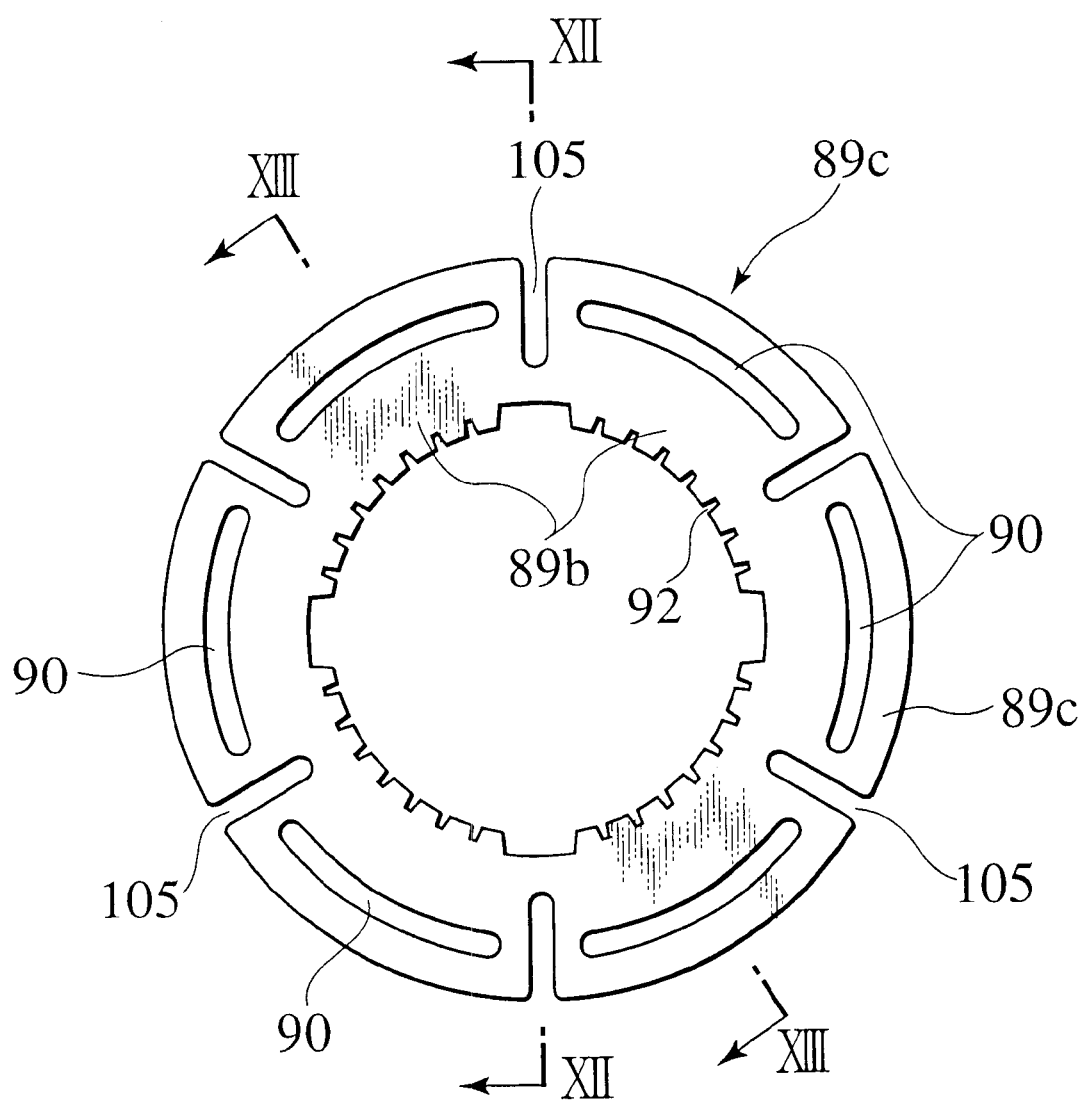
FIG. 11 is a front view of an inner plate of a fifth preferred embodiment according to the present invention.
Figure 12:
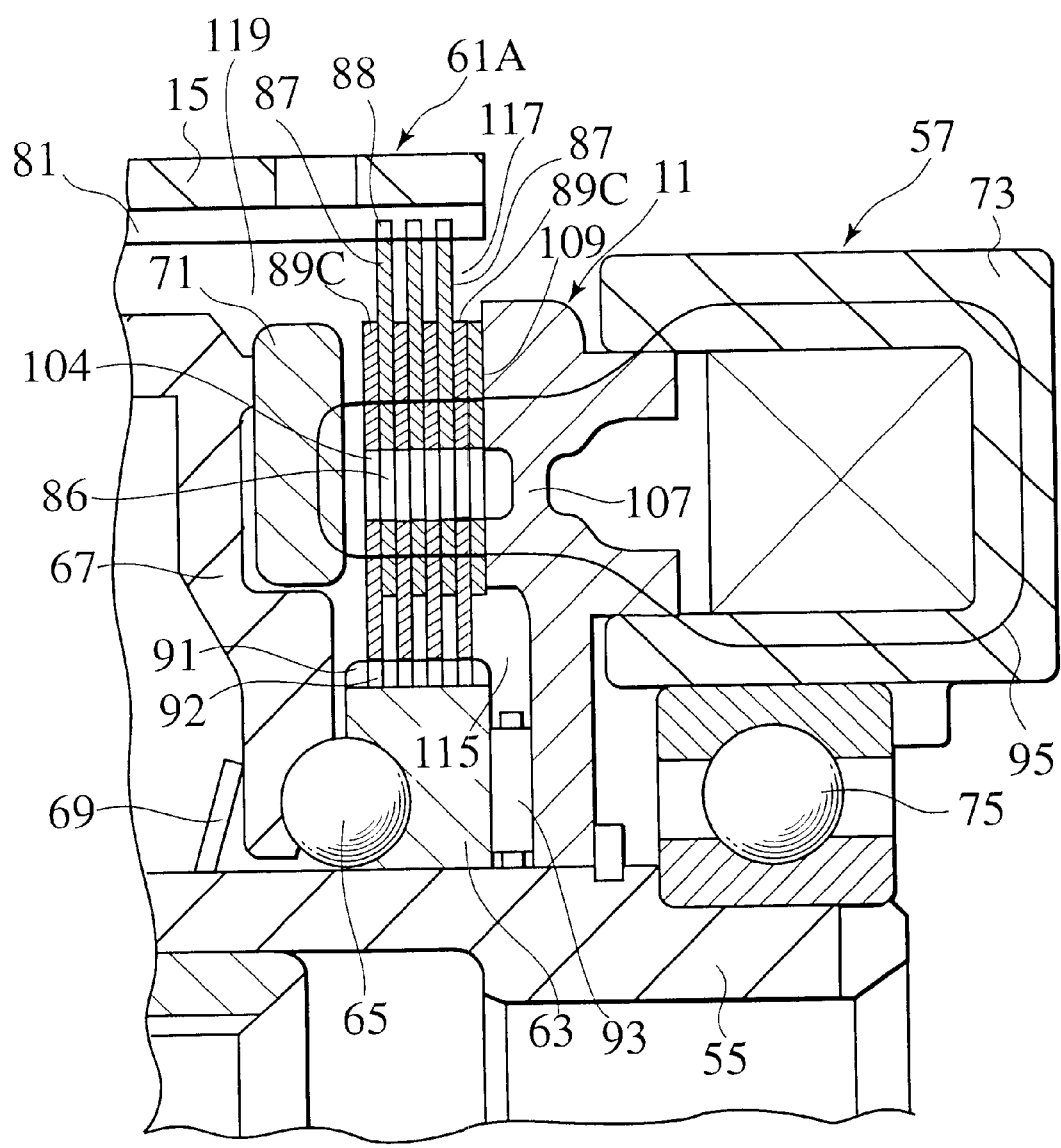
FIG. 12 is an enlarged cross sectional view of principal parts of a pilot clutch illustrating the inner plate of FIG. 11 in cross section taken on line 12—12 of FIG. 11.
Figure 13:
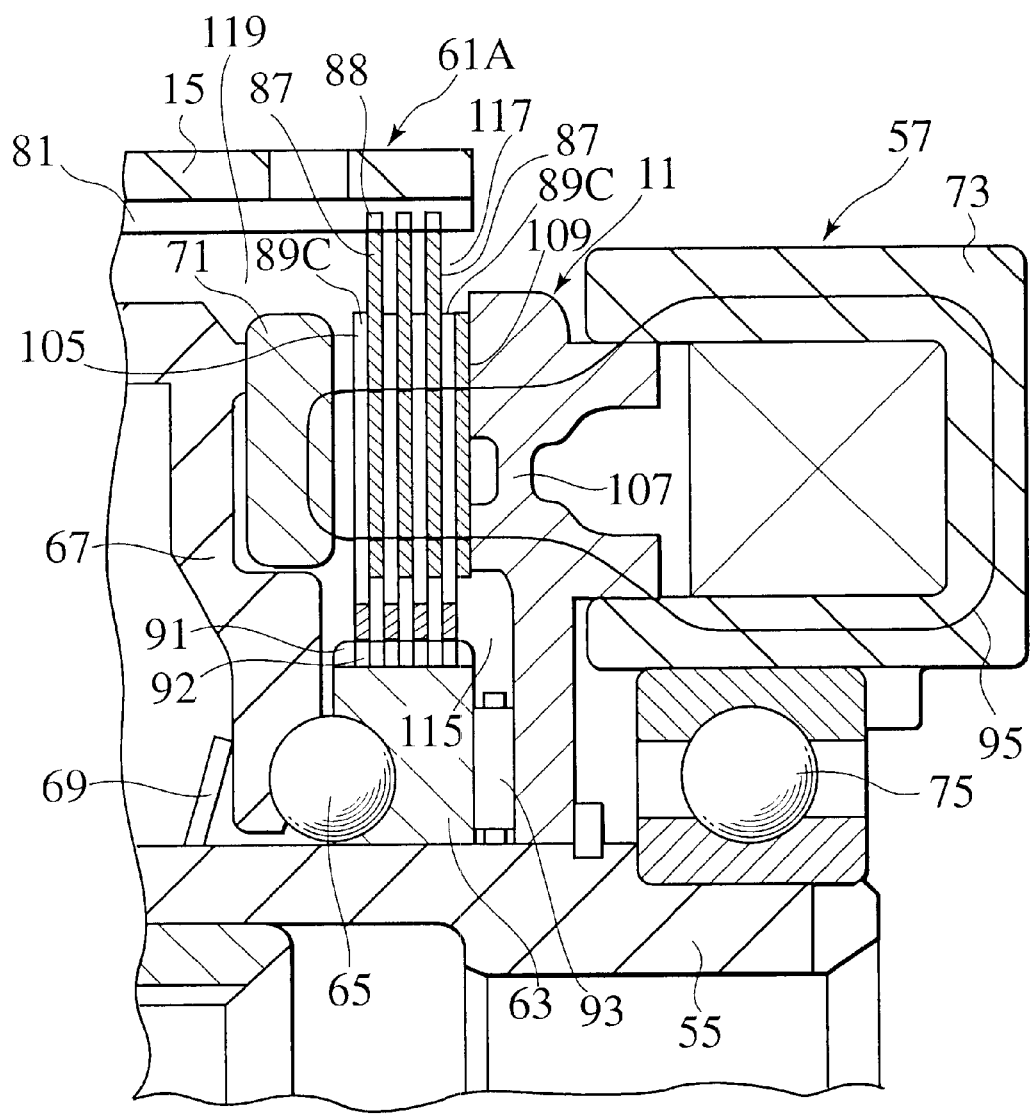
FIG. 13 is an enlarged cross sectional view of the principal parts of the pilot clutch illustrating the inner plate of FIG. 11 in cross section taken on line 13—13 of FIG. 11.

FIGS. 11 to 13 illustrate an inner plate 89C of a fifth preferred embodiment to be used in combination with the outer plate 87 of FIG. 3B to form a clutch plate 61A (see FIGS. 12 and 13). The inner plate 89C of the fifth preferred embodiment is identical with the inner plate shown in FIG. 3A except for oil guide passageways 105, and the same parts bear the same reference numerals as those used in FIG. 3A to omit redundant description.

As shown in FIG. 3B, the outer plate 87 has the outer periphery formed with the plurality of circumferentially spaced engaging protrusions 88 that mesh with the spline portion 89 of the cylindrical member 15. On the other hand, an inner periphery of the inner plate 89C shown in FIG. 11 is formed with engaging protrusions 92 that mesh with the spline portion 91 of the cam ring 63.

Further, the outer plate 87 and the inner plate 89C include oil guide passageways 86, 90, respectively, which serve as the gaps for preventing the short-circuiting of the magnetic flux path. The oil guide passageways 86, 90 have arcuate shapes, respectively, which are circumferentially spaced from one another with a given space. Also, in FIG. 11, although the inner plate 89C is shown, it is to be noted that the gap portions 86 of the outer plate 87 are formed at positions opposing to the gap portions 90 of the inner plate 89C in a substantially similar shape.

With such a structure, the above described magnetic flux loop 95 shown in FIG. 12 is formed with the rotor 11, the outer plates 87 and the inner plates 89C of the pilot clutch 61A, and the armature 71.

As shown in FIG. 11, further, the inner plate 89C of the pilot clutch 61A is formed with a plurality of additional oil guide passageways 105, which are circumferentially spaced from one another to remain between adjacent oil guide passageways 90, 90.

In particular, each of the oil guide passageways 105 radially extends toward the outer periphery of the inner plate 89C from an area near the inside magnetic flux path forming portion 89b such that, as shown in FIG. 13, a terminal end of each oil guide passageway 105 are brought into communication with the oil chambers 117, 119. In the presently filed preferred embodiment, each of the oil guide passageways 105 is formed so as to allow the outer diameter side of the inner plate 89C to communicate with the oil chamber 117, 119 while compelling the inner diameter side of the inner plate 89C to communicate with the oil chamber 115.

The presence of such oil guide passageways 105 formed in the inner plate 89C enables the hydrodynamic pressure effect to occur during rotation of the outer plates 87 for compelling the oil remaining in the oil chamber 117 between the inner plates 89C and the rotary case 3 to flow into the associated sliding areas between the adjacent outer plate 87 and the inner plate 89C via the oil guide passageways 105. And, the oil being introduced into the sliding areas acts so as to separate the adjacent outer plate 87 and the inner plate 89C from one another. Thus, it is possible for the drag torque between the outer plate 87 and the inner plate 89C to be effectively limited.

As set forth above, since the inner plate 89C of the pilot clutch 61A is formed with the oil passageways 105 to guide the oil to the associated sliding portions between the inner plate 89C and the outer plate 87 and the oil guide passageways 105 communicate with the oil chambers 117, 119, as the inner plates 89C rotate, the hydrodynamic pressure effect is created to cause the oil to be introduced into the oil guide passageways 105 from which the oil is introduced to the associated sliding portions to compel the oil to smoothly separate the inner plates 89C and the outer plates 87. Thus, it is possible for the drag torque to be effectively limited.

The presence of capability of providing a limited drag torque causes no pilot torque to be produced in the pilot clutch 61A, enabling the main clutch 59 from being undesirably coupled via the ball cam 65 due to the pilot torque. Thus, the absence of undesired coupling of the main clutch 59 provides no provability of a shift into the four wheel drive condition during the two wheel drive condition. This results in a stabled traveling ability, while eliminating a drive loss to provide an improvement over fuel consumption.

Further, since there is no probability of an undesired urged condition to couple the main clutch 59 (see FIG. 2), the temperature rise of the main clutch 59 can be limited, with a resultant increase in the durability of the main clutch 59.

Further, the increase in the durability of the main clutch 59 enables the main clutch 59 to be structured with a material which is light in weight and low ill cost.

Moreover, with the structure of the presently filed preferred embodiment, the presence of the oil guide passageways 105 formed in the radial direction of the inner plate 89C allows a surface, which remains in contact with the associated sliding area of the outer plate 87 adjacent the oil guide passageway 105 during the differential rotations, to have a larger area than that provided by the structure in which the lengthwise oil guide passageway is disposed in the circumferential direction.

This means that, since the surface area S, where the oil guide passageway 105 remains in contact with the sliding area during differential rotations between the inner plate 89 and the outer plate 87, is obtained by a product of a radial dimension of L×rotational angle of θ (corresponding to the amount of rotational incremental movement), the surface area S has a larger value ($S_2 > S_1$) than that of the structure (with a radial dimension of $L_1$) wherein the oil guide passageway 105' is formed along the circumferential direction because the structure (with a radial dimension of $L_2$) in which the oil guide passageway 105 is formed in the radial direction has a larger radial dimension ($L_2 > L_1$).

Figure 14A:
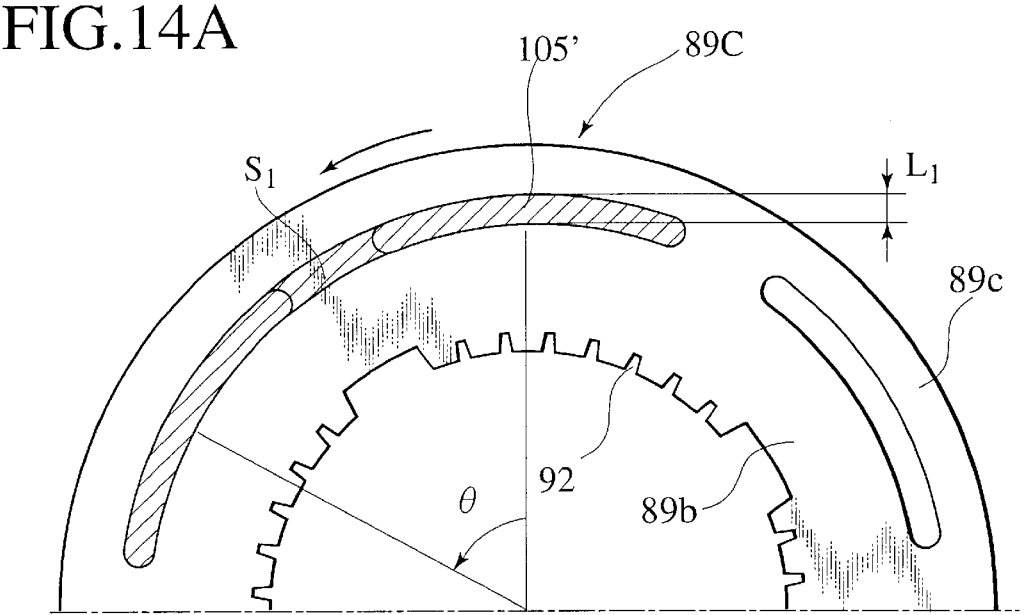
FIGS. 14A and 14B are views illustrating acting surface areas of oil guide passageways relative to sliding areas between the inner plate of FIG. 11 and the adjacent outer plate.

Here, a detailed description is given below with reference to FIGS. 14A and 14B which illustrate portions of virtual inner plates 89C. Suppose that the oil guide passageway 105' is formed in the circumferential direction as shown in FIG. 14A. If, in this instance, the radial dimension of the oil guide passageway is $L_1$ and the relative rotational angle between the inner plate 89C and the outer plate 87 is θ, then the surface area $S_1$ which falls in the sliding area of the oil guide passageway 105' is indicated with a region (surface area $S_1$) shown by oblique lines in the drawing.

Figure 14B:
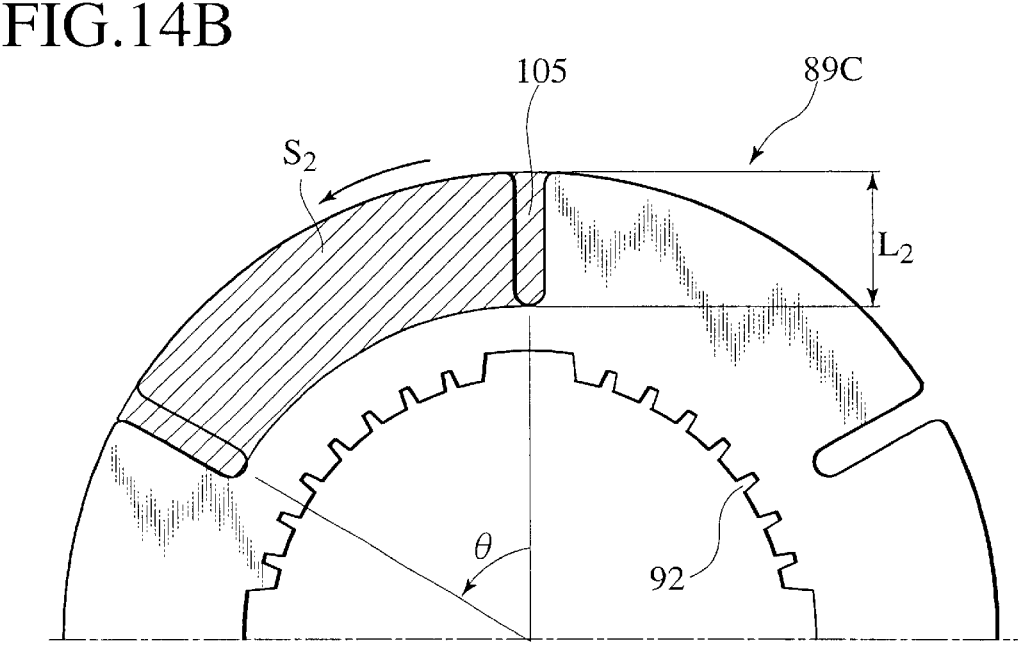

On the contrary, in case of the inner plate 89C of the fifth preferred embodiment in which oil guide passageway 105 is formed in the radial direction as shown in FIG. 14B, if the radial direction of the oil guide passageway is $L_2$ and the relative rotational angle is θ, then the surface area $S_2$ in which the oil guide passageway 105 and the sliding remain in contact is indicated with a region (surface area $S_2$) shown by oblique lines in the drawing. Thus, it appears that the surface area $S_2$ has an extremely wider range than the region (surface area $S_1$) in which the oil guide passageway 105' is formed in the circumferential direction.

As such, it is possible for the structure shown in FIG. 14B to be highly effective to separate the clutch plates, thereby enabling the drag torque to be effectively eliminated.

Further, the presence of the oil guide passageway 105 which remains in communication with the inside oil chamber 115 via the oil chambers 117, 119 disposed at the outer diameter sides of the inner plate 89C and the outer plate 87 allows the oil to be drawn into the oil guide passageway 105 from the oil chambers 117, 119 at the outer diameter sides of the inner plate 89C due to the hydrodynamic pressure effect whereby an excessive amount of oil is expelled to the oil chamber 115 at the inner diameter side while permitting the oil to be introduced into the sliding portion of the outer plate 87. This permits a smooth oil flow through the oil guide passageway 105 such that the inner plate 89C and the outer plate 87 are more smoothly separated from one another to eliminate the drag torque in a reliable manner.

Further, the presence of the oil guide passageway 105 disposed between the oil guide passageways 90, 90 ensures the clutch plate to have an increased rigidity.

Furthermore, while the presently filed preferred embodiment has been shown and described in conjunction with an example in which the oil guide passageway 105 is formed in the inner plate 89C, the present invention is not limited thereto and the oil guide passageway 105 may also be formed in the outer plate 87 or in both of the inner plate 89C and the outer plate 87.

Figure 15:
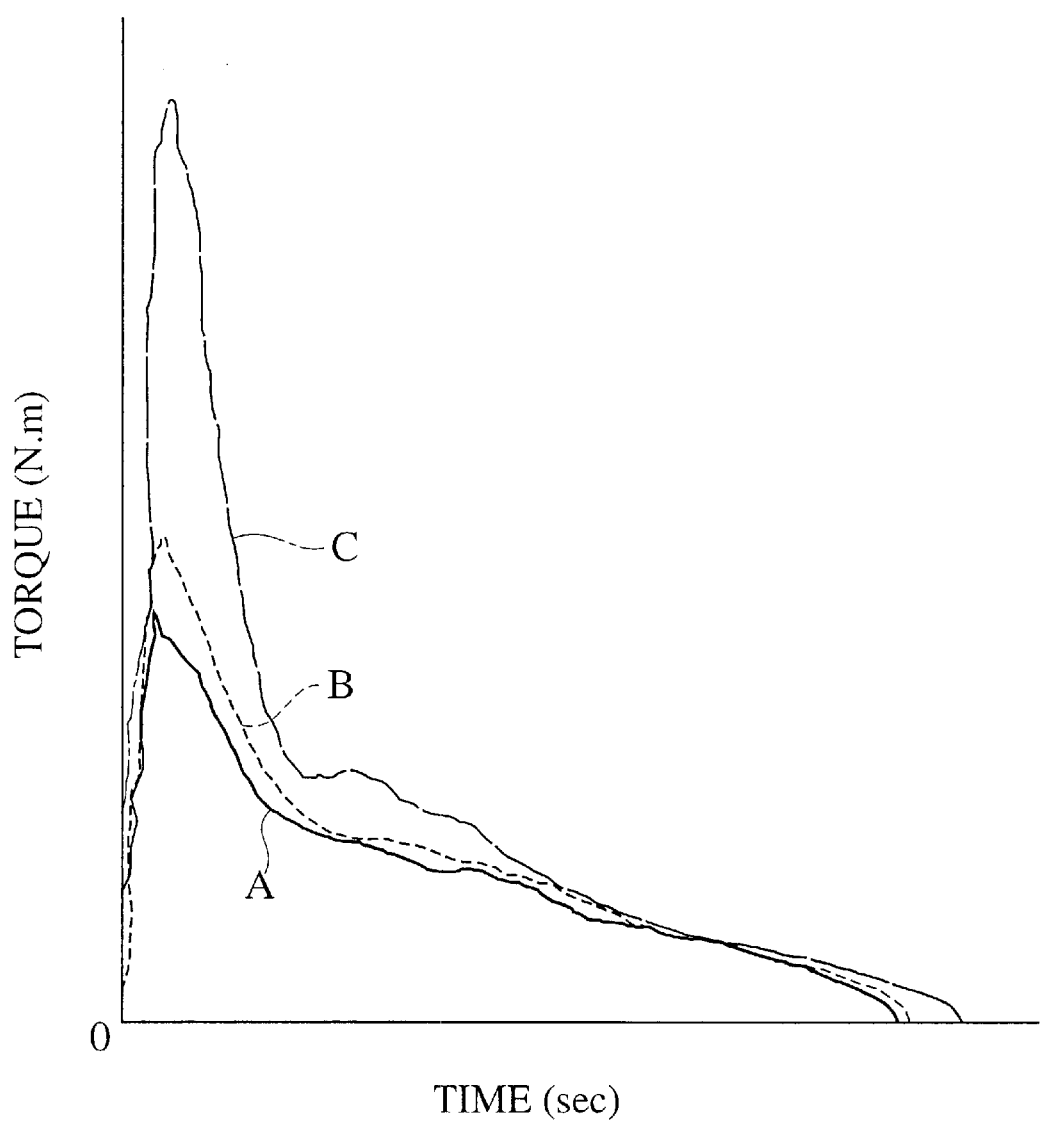
FIG. 15 is a characteristic view illustrating a drag torque of a main clutch employing the inner plate of FIG. 1.
Figure 16:
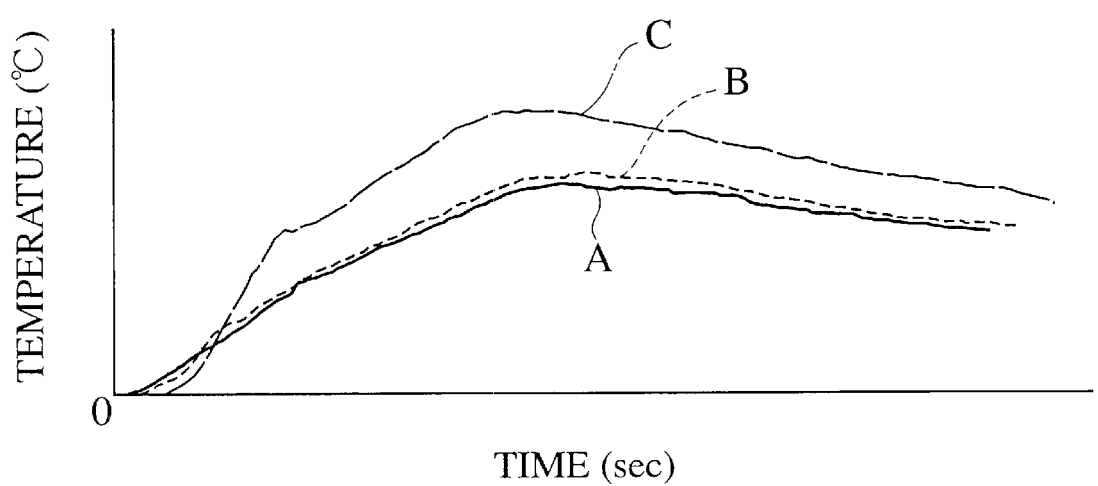
FIG. 16 is a characteristic view illustrating a temperature variation of the main clutch employing the inner plate of FIG. 1.

FIGS. 15 and 16 illustrate performances of an electromagnet clutch, in a case where the wet type friction clutch incorporating the inner plate 89C of the fifth preferred embodiment is applied to the pilot clutch 61A, in comparison with other clutches.

FIG. 15 shows a performance of the drag torque of the pilot clutch 61A, with a solid line A representing a case in which the oil guide passageway is formed in both of the inner plate 89C and the outer plate 87, a dotted line B representing a case where the oil guide passageway is formed only in the inner plate 89C and a phantom line C representing a case of a state-of-the-art structure with no oil guide passageway.

As will be apparent from the solid line A and the dotted line B, it is understood that the pilot clutch 61A incorporating the clutch plates of the fifth preferred embodiment provides a less drag torque than that of the pilot clutch of the state-of-the-art structure as shown by the phantom line C.

FIG. 16 shows a graph illustrating the temperature variation of the main clutch 59 (see FIG. 2) plotted in a case where the inner plate 89C is assembled in the pilot clutch 61A, with a solid line A representing a case in which the oil guide passageway is formed in both of the inner plate 89C and the outer plate 87, a dotted line B representing a case where the oil guide passageway is formed only in the inner plate 89C and a phantom line C representing a case of a state-of-the-art structure with no oil guide passageway.

As will be apparent from the solid line A and the dotted line B, it is understood that the temperature rise of the main clutch, in case of the pilot clutch 61a which employs the inner plate 89C of FIG. 11, is lower than that of the state-of-the-art structure as shown by the phantom line C and that the probability in occurrence of undesirably urging the main clutch 59 in dependence on the drag torque of the pilot clutch 61A (see FIGS. 12 ad 13) is effectively lessened.

Also, it is to be appreciated that the results disclosed in FIGS. 15 and 16 may be similarly obtained with various structures of the other preferred embodiments of the present invention.

Sixth Preferred Embodiment

An outer plate 87B of a sixth preferred embodiment and a pilot clutch 61B incorporating the outer plate 87B are described below with reference to FIGS. 17 to 19 and FIGS. 20A and 20B.

Figure 17:
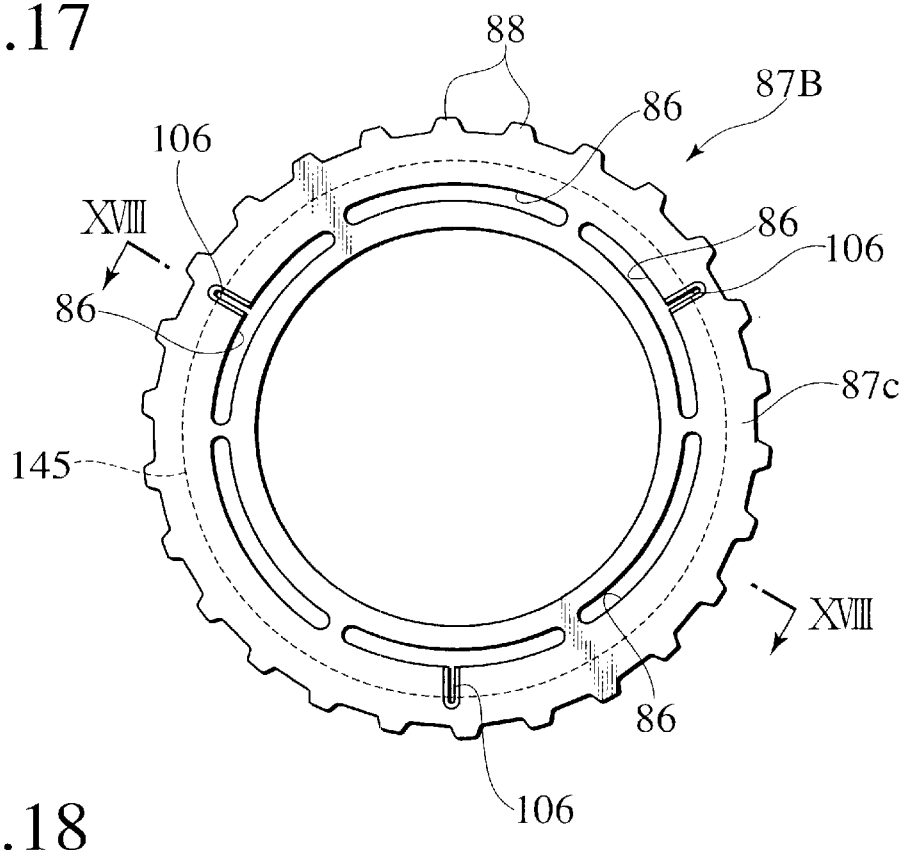
FIG. 17 is a front view of an outer plate of a sixth preferred embodiment according to the present invention.
Figure 18:
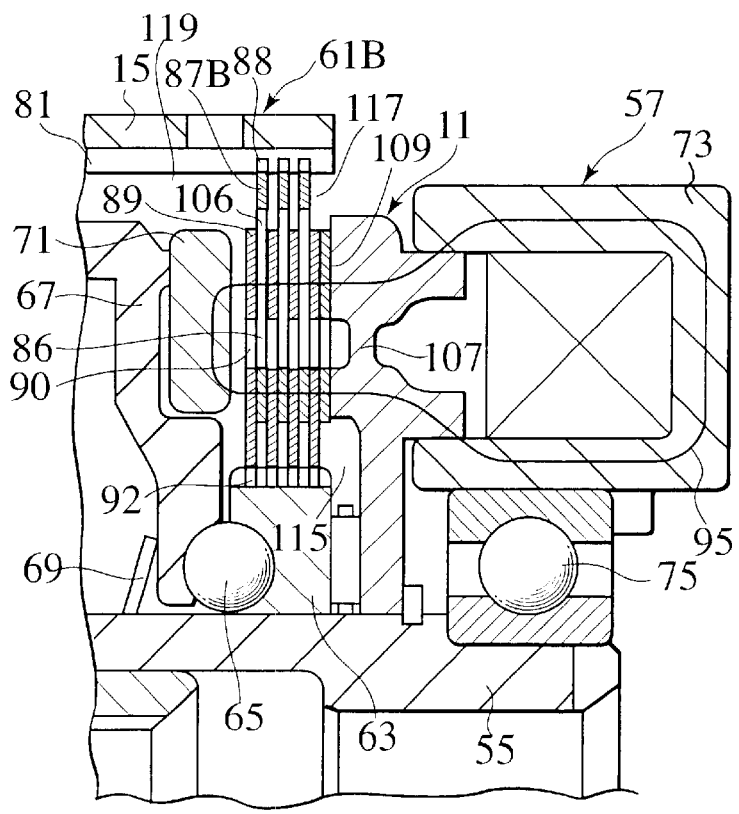
FIG. 18 is an enlarged cross sectional view of principal parts of a pilot clutch illustrating the outer plate of FIG. 17 in cross section taken on line 18—18 of FIG. 17.

FIG. 17 is a front view illustrating the clutch plate (outer plate 87B) of the sixth preferred embodiment for use in a wet-type friction clutch, and FIG. 18 is a cross sectional view of the pilot clutch 61B showing the outer plates 87B in cross section taken on line 18—18 of FIG. 16.

The outer plate 87B of the sixth preferred embodiment is identical with the outer plate 87 shown in FIG. 3B except for an oil guide passageway, and the same parts bear the same reference numerals as those used in FIG. 3B to omit a redundant description.

FIGS. 17 and 18 illustrate an outer plate 87B which forms a part of the pilot clutch 61B, with a disc shaped body portion having an outer diametric periphery formed with a plurality of engaging protrusions 88 to mesh with the spline portion 81 of the cylindrical member 15. Further, the body portion has a plurality of circular arc shaped oil guide passageways 86 which are circumferentially spaced from one another with a given distance and which serve as gap portions to prevent the magnetic flux path of the electromagnet 57 from being short circuited.

Oil guide passageways 106 are formed in communication with some of the oil guide passageways 86. Each of the oil guide passageway 106 radially extends outward at an intermediate portion of the associated oil guide passageway 86 and has its remotest end terminating at a magnetic flux path forming portion 87c formed in an outer circumferential periphery at a point outside the sliding portion of the inner plate 89. That is, a dotted circle line 145 indicates a distal end of or a locus of the sliding portion of the inner plate 89 and, in this respect, the oil guide passageway 106 extends toward an area outside the associated sliding distal end 145 for communication with the oil chambers 117, 119.

Figure 19:
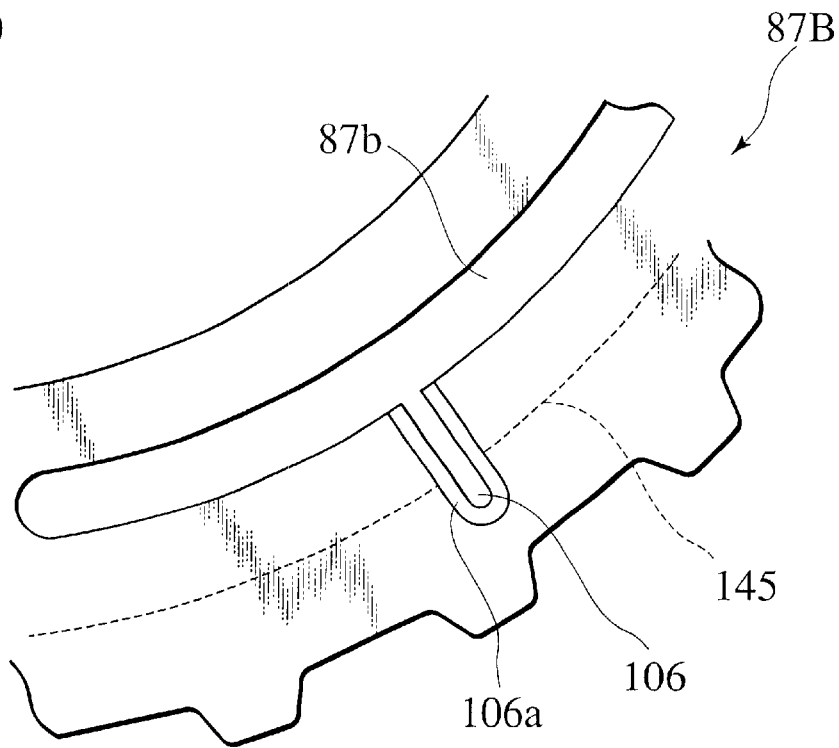
FIG. 19 is an enlarged view of an essential part of the outer plate shown in FIG. 17.
Figure 20A:
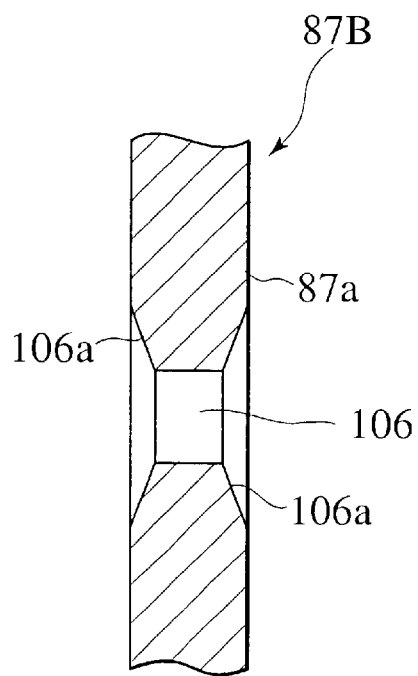
FIG. 20A is an enlarged cross sectional view of the essential part of the outer plate shown in FIG. 19.
Figure 20B:
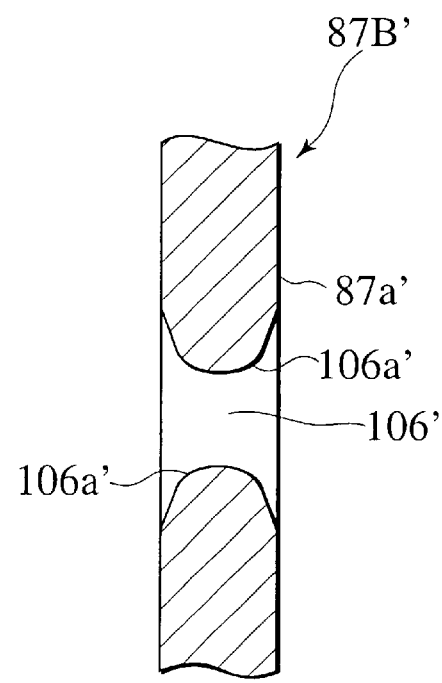
FIG. 20B is an enlarged cross sectional view of an essential part of a modified form of the outer plate shown in FIG. 19.

Further, as shown in FIG. 19 and FIGS. 20A and 20B in enlarged scales, the oil guide passageway 106 is formed to penetrate through the body portion of the outer plate 87B in a thickness direction thereof such that the oil guide passageway 106 has an edge portion which is made thinner than the thickness of the body portion of the outer plate 87B to define a space between the outer plate 87B and the adjacent inner plate 89. Thus, the formation of the space between the edge portion of the oil guide passageway 106 of the outer plate 87B and the adjacent inner plate 89 allows the oil to be stored in the space portion, to the extent of which the amount of oil to be introduced into the sliding portions between the inner plate 89 and the outer plate 87B can be increased. Further, the formation of the space compels the space per se to serve as a guide to introduce the oil between the inner plate 89 and the outer plate 87B, providing a capability of effectively introducing the oil to the sliding portions between the inner plate 89 and the outer plate 87B. This results in a further elimination of the drag torque.

Further, in FIG. 20A, an edge portion of the oil guide passageway 106 is formed to be contiguous with an outer surface 87a of the outer plate 87B via an inclined wall portion 106a. With such a structure, the oil flows along the inclined wall portion 106a into the oil guide passageway 106 from which the oil enters the oil guide passageway 86, enabling the oil to be smoothly introduced into the sliding areas between the inner plate 89 and the outer plate 87B for thereby effectively eliminating the drag torque.

FIG. 20B illustrated a modified form of the oil guide passageway, with both sides thereof, in an axial direction, having edge portions 106a' each of which is configured in a circular arc shape. The presence of the edge portions 106a' of the oil guide passageway 106' each formed in the arcuate cross section (which is formed by stamping a steel plate in a thickness direction thereof so as to form the edge portions in the circular arc shapes) enables the oil to be drawn to the oil guide passageway in a smooth manner. This enables the oil to be smoothly introduced into the sliding areas between the inner plate 89 and the outer plate 87B' for thereby eliminating the drag torque.

With the oil guide plates 106, 106' of such outer plates 87B, 87B', since the oil in the oil chamber 117 is guided to the sliding portion of the inner plate 89, it is possible for the outer plate 87B (or 87B') and the inner plate 89 to be separated from one another.

With the structure of the presently filed preferred embodiment, further, since the oil guide passageway 106 remains in communication with the oil guide passageway 86, the oil is enabled to be introduced into the oil guide passageway 86, resulting in an increase in the amount of oil to be introduced, to the extent of which the outer plate 87B and the inner plate 89 can be reliably separated from one another. This enables the drag torque to be effectively eliminated to provide no probability of undesired shift into the four wheel drive condition whereby a traveling property is stabilized while eliminating a loss of drive power to improve fuel consumption. In addition, it is possible for the temperature rise of the main clutch 59 (see FIG. 2) to be eliminated, with a resultant increased durability.

Further, it is possible for the pilot clutch to include the outer plate 87B shown in FIG. 17 and the inner plate 89C shown in FIG. 10 in combination. The inner plate 89C of FIG. 11 is formed with the plurality of oil guide passageways 105 extending in the radial direction, providing a capability of introducing the oil to the sliding area of the outer plate 87B from the inner plate 89C. With such a structure in which the oil is introduced from both the inner plate 89C and the outer plate 87B, a large amount of oil can be introduced to smoothly separate the inner plate 89C and the outer plate 87B from one another. This enables the drag torque to be effectively eliminated.

Seventh Preferred Embodiment

Figure 21:
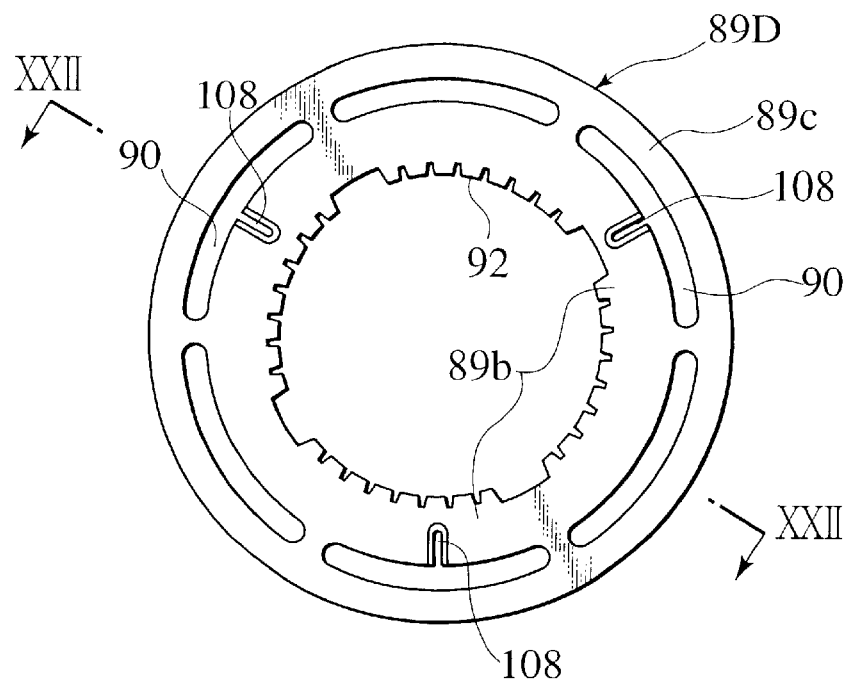
FIG. 21 is a front view of an inner plate of a seventh preferred embodiment according to the present invention.
Figure 22:
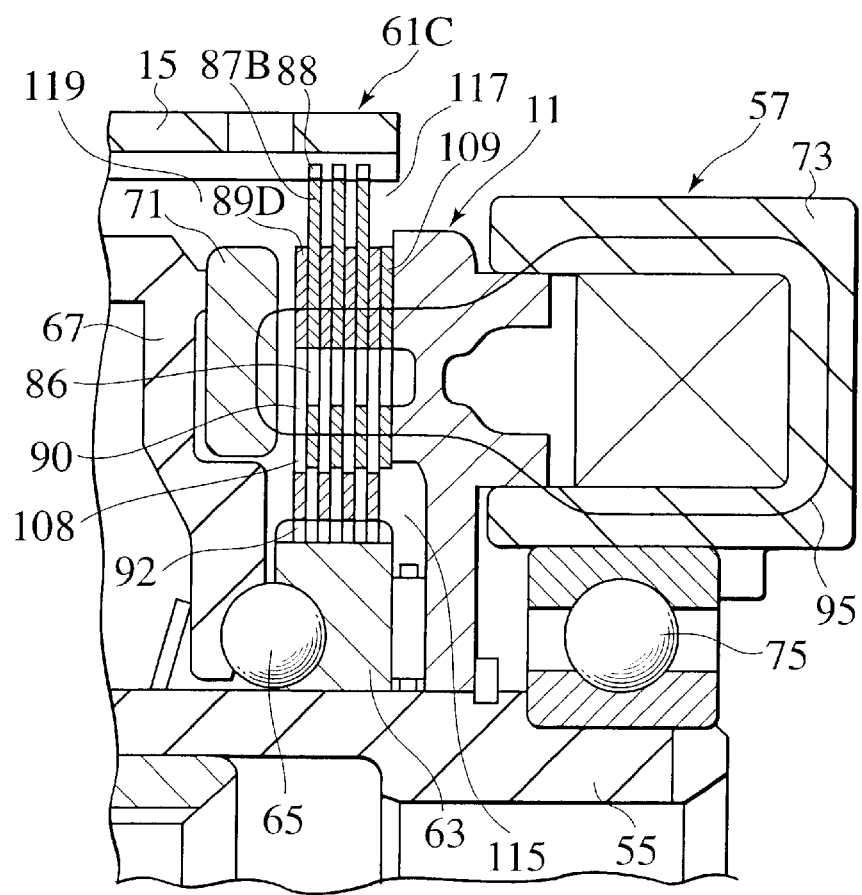
FIG. 22 is an enlarged cross sectional view illustrating principal parts of a pilot clutch incorporating the inner plate in cross section taken on line 22—22 of FIG. 21.

FIGS. 21 and 22 illustrate an inner plate 89D of a seventh preferred embodiment, FIG. 21 is a front view of the inner plate 89D of the seventh preferred embodiment and FIG. 22 is a cross sectional view of a pilot clutch 61C taken on line 22—22 of FIG. 21.

The inner plate 89D of the seventh preferred embodiment is identical with the inner plate of FIG. 3A except for an oil guide passageway 108, and like parts bear the same reference numerals as those used in FIG. 3A to omit a redundant description.

As shown in FIGS. 21 and 22, in the seventh preferred embodiment, the inner plate 89D of a pilot clutch 61C is formed with the oil guide passageways 108, with the inner plate 89D corresponding to a modification of the above described sixth preferred embodiment wherein the outer plate 87B is formed with the oil guide passageways 106.

Accordingly, the presence of the oil guide passageways 108 each of which has the same cross section as that of the above described oil guide passageway 106 enables the same function and effect as those of the sixth preferred embodiment set forth above.

In particular, the oil guide passageways 108 are formed to be contiguous with some of the oil guide passageways 90 from intermediate portions of which each of the oil guide passageways 108 radially extends inward so as to fall in the magnetic flux path forming portion 89b near the inner periphery of the inner plate 89D. Thus, the presence of such oil guide passageways 100 radially extending inward from the intermediate portions of the associated oil guide passageways 90 allows the oil to be reliably introduced into the sliding portion of the outer plate 87B.

As shown in FIG. 22, further, the pilot clutch 61C may be structured in combination with the inner plate 89D and the outer plate 87B shown in FIG. 17.

With such a structure set forth above, the oil guide passageways 106 formed in the outer plate 87B and the oil guide passageways 108 of the inner plate 89D of the pilot clutch 61C are capable of communicating with the oil chambers 117, 119 disposed at the outer diametric side and the oil chamber 115 disposed at the inner diametric side, permitting the oil to be drawn into the oil guide passageways 106 from the oil chambers 117, 119 disposed at the outer diametric side closer thereto for thereby introducing the oil into the sliding portion of the outer plate 87B while permitting the oil to be supplied to the oil guide passageways 108 via the oil guide passageways 86, 90 whereupon the oil is introduced into the sliding area of the inner plate 89D from the oil guide passageways 108 to allow an excessive amount of oil to be expelled to the oil chamber 115 disposed at the inner diameter side. As such, a smooth oil flow is ensured through the oil guide passageways 106, 108 to allow the inner plate 89D and the outer plate 87B to be smoothly separated from one another to eliminate the drag torque.

Eighth Preferred Embodiment

Figure 24:
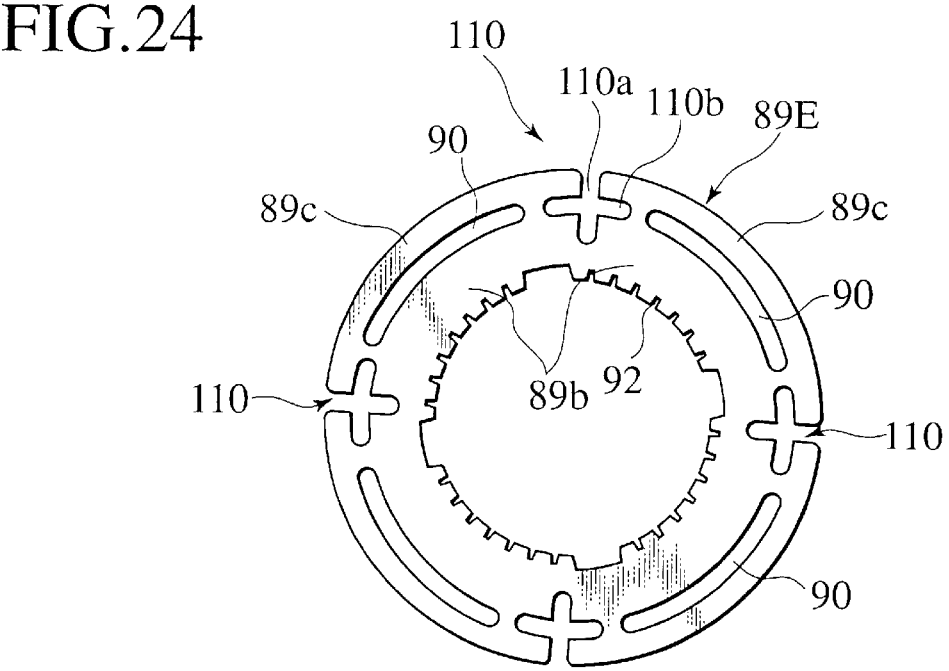
FIG. 24 is a front view of an inner plate of an eighth preferred embodiment according to the present invention.

FIG. 24 illustrates an inner plate of an eighth preferred embodiment to be employed as a clutch plate of a wet type friction clutch. Also, the eighth preferred embodiment indicates an example with oil guide passageways different in shape from those of the above described fifth to seventh preferred embodiments, with like parts bearing the same reference numerals as those used in the previously described preferred embodiments to omit a redundant description.

FIG. 24 shows an inner plate 89E of the pilot clutch 61D (see FIG. 22) with a structure wherein a plurality of oil guide passageways 110 are formed in a circumferential direction between adjacent oil guide passageways 90, 90 which are also formed in the circumferential direction with a given distance.

Each of the oil guide passageways 110 is formed in an area between an outer diametric side and an inner diametric side so as to extend between a magnetic flux path forming portion 89c near an outer diametric side and a magnetic flux path forming portion 89b near an inner diametric side. That is, each oil guide passageway 110 is comprised of a radially extending component 110a, which extends between the magnetic flux path forming portion 89c near the outer diametric side and the magnetic flux path forming portion 89b near the inner diametric side, and a circumferentially extending component 110b which falls in circumferential alignment with the adjacent oil guide passageways 90, 90 to form a cross shape. Further, the oil guide passageway 110 extends far outside than a sliding distal end area of the inner plate 89E remaining in contact with the outer plate 87B. With such an oil guide passageway 110, since the oil in the oil chamber 117 is introduced into the sliding area of the outer plate 87B, the outer plate 87B and the inner plate 89E can be effectively separated from one another. Thus, it is possible for the drag torque to be reliably eliminated.

Particularly, the presence of the oil guide passageway 110 formed with the circumferentially extending component 110b allows an increased amount of the oil to be introduced, to the extent of which the outer plate 87B and the inner plate 89E can be reliably separated from one another.

Figure 23:
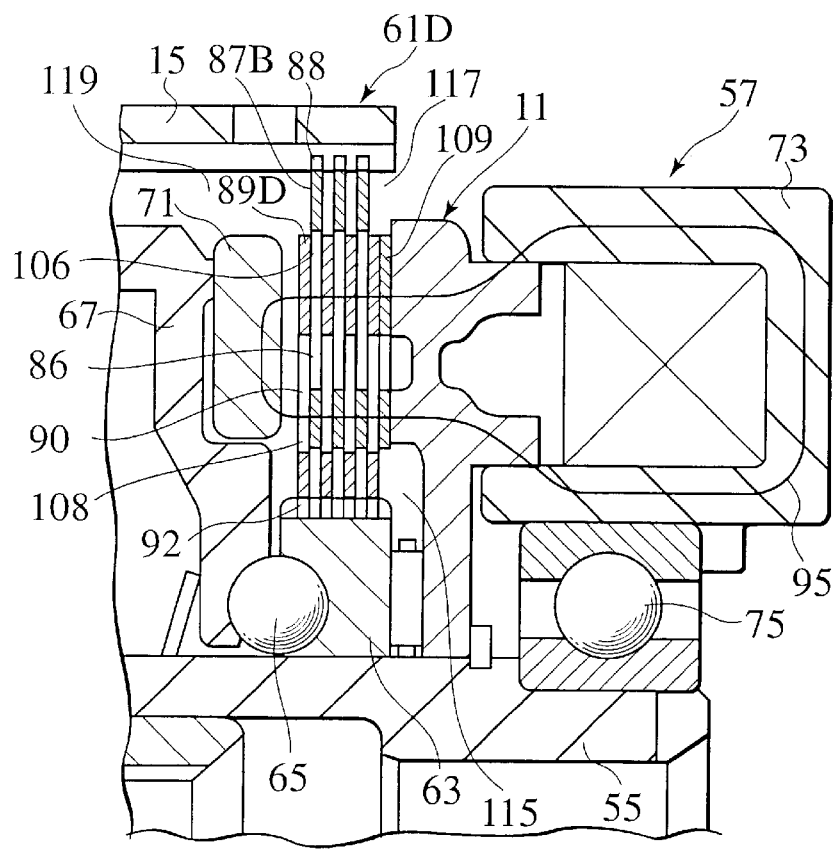
FIG. 23 is an enlarged cross sectional view illustrating principal parts of a pilot clutch incorporating the outer plate of FIG. 17 and the inner plate of FIG. 21 in combination.

As shown in FIG. 23, it is possible for a pilot clutch 61D to be structured with the inner plate 89E of the preferred embodiment shown in FIG. 24 and the outer plate 87B shown in FIG. 23 in combination. The outer plate 87B of FIG. 17 is formed with the oil guide passageways 106, some of which communicate with the oil guide passageways 86. Combining this outer plate 87B with the inner plate 89E allows the oil to be introduced into the sliding portions between the inner plate 89E and the outer plate 87B from both of the same at an increased flow rate, enabling the inner plate 89E and the outer plate 87B to be smoothly separated from one another.

Ninth Preferred Embodiment

Figure 25:
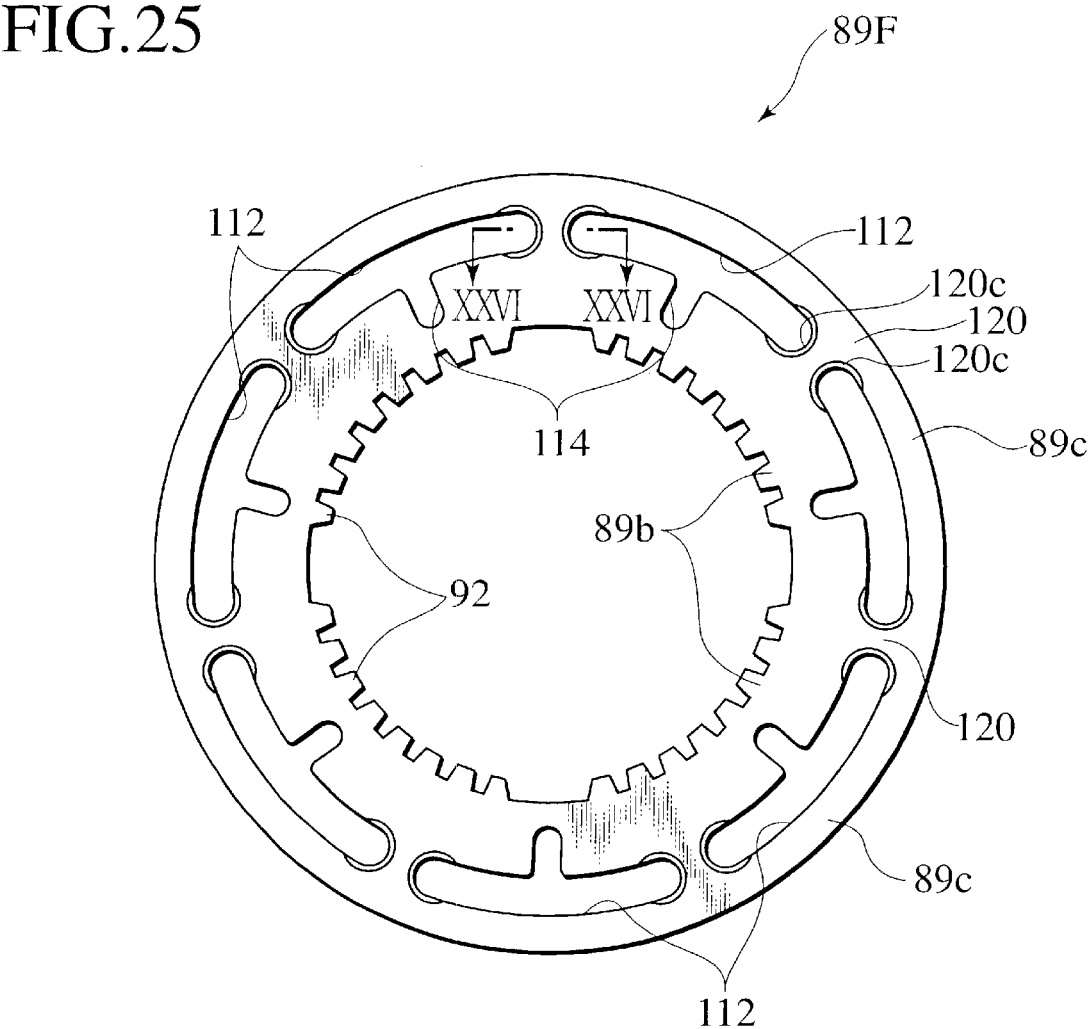
FIG. 25 is a front view of a clutch plate for an electromagnetic clutch forming an inner plate of a ninth preferred embodiment according to the present invention.
Figure 26:
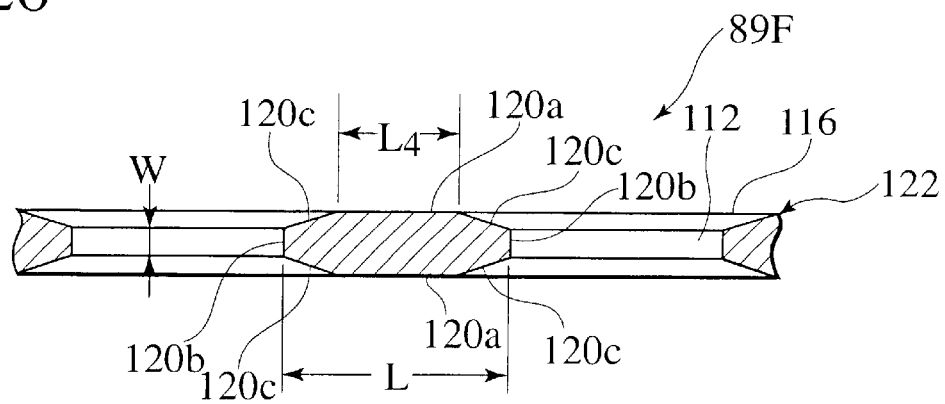
FIG. 26 is an enlarged cross sectional view of an essential part of the clutch plate taken on line 26—26 of FIG. 25.

FIGS. 25 and 26 illustrate an inner plate of a ninth preferred embodiment to be employed as a clutch plate (hereinafter referred to as "a clutch plate") for an electromagnetic clutch. FIG. 25 is a front view of the clutch plate 89F, and FIG. 25 is an enlarged cross sectional view taken on line 26—26 of FIG. 25, with the clutch plate 89F being described below with reference to the structure of the electromagnetic clutch 9 shown in FIG. 2 according to the need.

The clutch plate 89F shown in FIG. 25 is identical with the inner plate shown in FIG. 3A except for the oil guide passageway and is used in combination with the outer plate shown in FIG. 3B or FIG. 17 under a condition in which the oil guide passageway 112 of the inner plate shown in FIG. 25 is configured to have a larger width in a radial direction than that of such an outer plate whereby the oil guide passageway 112 has an increased volume.

FIG. 25 shows the clutch plate composed of an inner plate 89F of the presently filed preferred embodiment, with this clutch plate corresponding to the inner plate to be employed in the pilot clutch 61 of the electromagnetic clutch 9 shown in FIG. 2 and having an inner circumferential periphery formed with spline teeth 92 which engage the cam ring 63 of the right boss portion 55, which serves as one of the drive side or the driven side, in a rotational direction via the ball cam 65.

While the ninth preferred embodiment is described with reference to an example wherein the inner plate 89F is applied to the clutch plate, it is possible for the concept of the inner plate 89F to be applied to the outer plate whose outer periphery engages the cylindrical member 15.

As shown in FIG. 25, the clutch plate 89F has an inner peripheral portion formed with a magnetic flux path forming portion 89b, an outer peripheral portion formed with a magnetic flux path forming portion 89c, and a plurality of oil guide passageways 112, composed of through-bores serving as oil retaining portions and gap portions each formed in a circular arc shape, which are circumferentially spaced with a given distance via bridge portions 120 intervened between the inner and outer magnetic flux path forming portions 89b and 89c. Also, each through-bore 112 formed in the circular arc shape has lengthwise ends formed in a semi-circular shape to preclude inner edges of the through-bore 112 from being suffered with a stress concentration.

Here, as shown in cross section in FIG. 26, each bridge portion 120 of the clutch plate of the presently filed preferred embodiment has opposing walls 120a, 120a, each of which faces an adjacent clutch plate (not shown) remaining in a direction (corresponding to the thickness direction of the clutch plate 89F) in which the clutch plates are interleaved, and an inner wall 120b facing each through-bore 112.

And, both side portions of each opposing wall 120a remaining in a circumferential direction (left and right direction in FIG. 26) are formed with inclined walls 120c, respectively, by which the width W of the inner wall 120b is lessened such that the shape of the bridge portion 120 is defined with a length $L_4$, along the periphery of the opposing wall 120a, which is smaller than a circumferential length L of the bridge portion 120 to entirely form an octagonal cross section. Also, as viewed in a frontal direction in FIG. 25, each inclined wall 120c dictates a circular arc shape along the semicircular edge of each through-bore 112.

Of course, even in a case where such an inclined wall 120c is formed to cause the bridge portion 120 to have a reduced cross sectional area, the bridge portion 120 is arranged so as to have a strength sufficient for connecting the inner peripheral portion (magnetic flux path forming portion 89b) and the outer peripheral portion (magnetic flux path forming portion 89c) of the clutch plate 89F.

In addition, the clutch plate 89F is formed with a plurality of oil guide passageways 114 each extending radially inward from an intermediate portion of an associated through-bore 112 and terminating at the inner peripheral magnetic flux path forming portion 89b. As set forth above with respect to the previous preferred embodiments, when assembling the plurality of inner plates 89F and the plurality of outer plates so as to compel these clutch plates to be interleaved to form the pilot clutch, the oil guide passageway 114 permits the oil, which has entered the associated oil guide passageway 112 due to the hydrodynamic pressure effect, to flow into or flow out from the sliding portion of the associated adjacent outer plate, providing an advantage of preferably performing coupling or uncoupling operations of the clutch.

With the clutch plate 89F of the presently filed preferred embodiment in such a structure set forth above, the inclined walls 120c are formed at both lengthwise or circumferential ends of each opposing wall 120a such that the length $L_4$ along the circumferential direction of the opposing wall 120a is shorter than the circumferential length L of the bridge portion 120.

Accordingly, the bridge portion 120 has a smaller cross sectional area, provided by the inclined walls 120c by which the thickness is reduced, than that of a case in which the bridge portion 120 is formed with no treatment by using the thickness of the clutch plate 89F as it is. As a consequence, due to a reduced thickness portion of the inclined wall 120c, a contact area between the opposing walls of the bridge portions of the mutually adjacent clutch plates is reduced and, hence, it is possible to decrease the amount of leakage of magnetic flux, via the bridge portion 120, which passes through the magnetic flux path forming portions 89b, 89c.

Accordingly, the magnetic flux density of the electromagnet 107 shown in FIG. 2 can be maintained at a high level, resulting in an increased attraction force of the armature 71 to increase the coupling force of the pilot clutch 61 for thereby precluding the main clutch mechanism 9 from being slipped.

Further, the presence of the bridge portion 120 formed with the inclined walls 120c compel the inclined walls 120c to have functions to push out the lubricating oil, filled in the clutch plate groups of the pilot clutch 61, toward areas outside the mating surfaces of the clutch plates 89F during rotations of the clutch plates 89F. This causes the lubricating oil, that acts in the push out direction, to act on the adjacent opposing clutch plate during an uncoupling state of the pilot clutch 61, thereby enabling the clutch plates to be reliably separated from one another to prevent a drag phenomenon of the clutch.

By the way, even though the bridge portion 120 is formed such that the opposing walls have reduced surface areas, the cross sectional area of the bridge portion 120 is ensured to have a strength sufficient for connecting the inner peripheral portion (magnetic flux path forming portion 89b) and the outer peripheral portion (magnetic flux path forming portion 89c) of the clutch plate 89F and, therefore, there is no probability for the clutch plate 89F from being ruptured during mutual pressured contact between associated clutch plates 89F.

Other Modified Forms

FIGS. 27 to 30 illustrate enlarged cross sectional views of modified forms of the clutch plate 89F of the ninth preferred embodiment, respectively.

Figure 27:
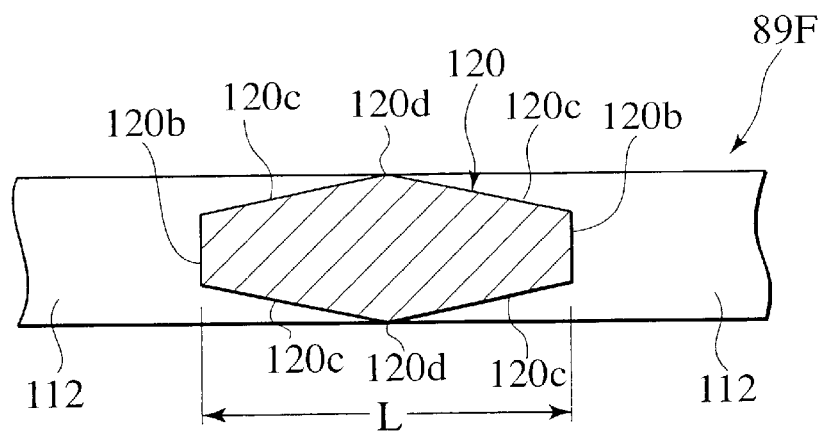
FIG. 27 is an enlarged cross sectional view illustrating a first modified form of a bridge portion shown in FIG. 26.

FIG. 27 illustrates a first modified form of the clutch plate 89F, wherein the opposing walls 120a are removed from the body portion to permit the inclined walls 120c to mutually and directly intersect one another to form a ridgeline 120d at a boundary corresponding to the opposing wall 120a such that a hexagonal cross sectional shape is entirely defined with inner walls 120b in two surfaces and inclined walls 120c in four surfaces.

Figure 28:
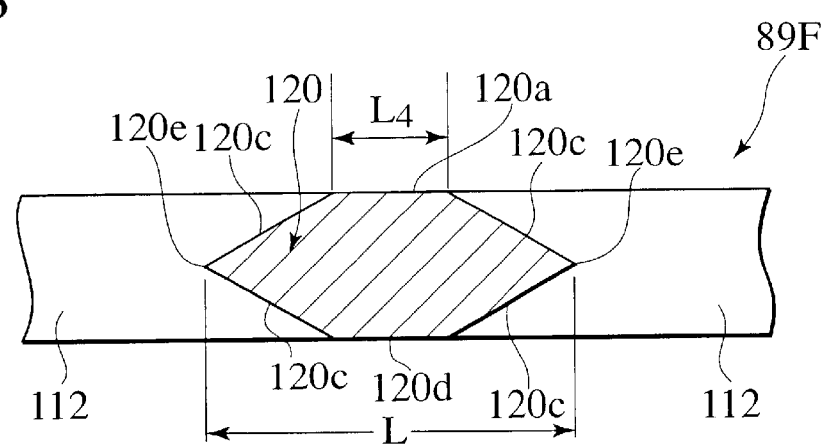
FIG. 28 is an enlarged cross sectional view illustrating a second modified form of a bridge portion shown in FIG. 26.

FIG. 28 illustrates a second modified form of the clutch plate 89F, wherein the inner walls 120b are removed from the body portion to permit the inclined walls 120c to mutually and directly intersect one another to form ridgelines 120e, 120e at boundaries corresponding to the inner walls 120b, 120b such that a hexagonal cross sectional shape is entirely defined with opposing walls 120a in two surfaces and inclined walls 120c in four surfaces.

Figure 29:
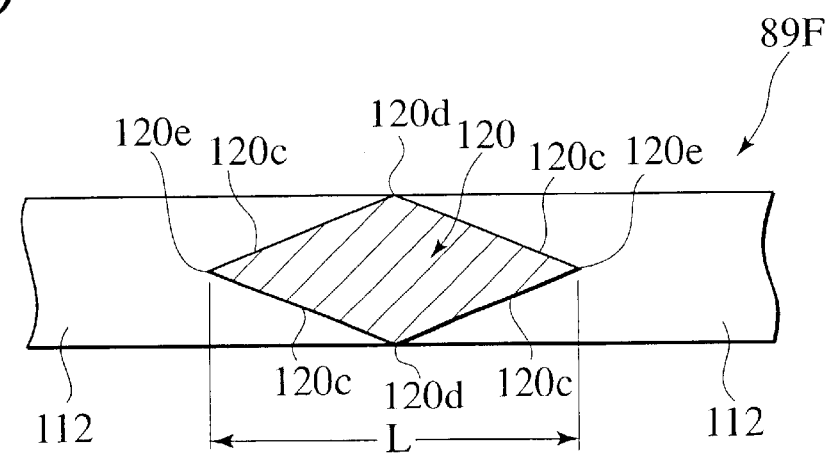
FIG. 29 is an enlarged cross sectional view illustrating a third modified form of a bridge portion shown in FIG. 26.

FIG. 29 illustrates a third modified form of the clutch plate 89F, wherein the opposing walls 120a and the inner walls 120b are removed from the body portion to permit the inclined walls 120c to mutually and directly intersect one another to form ridgelines 120e, 120e at boundaries corresponding to the inner walls 120b, 120b such that a rectangular cross sectional shape is entirely defined with the inclined surfaces 120c in four surfaces.

Figure 30:
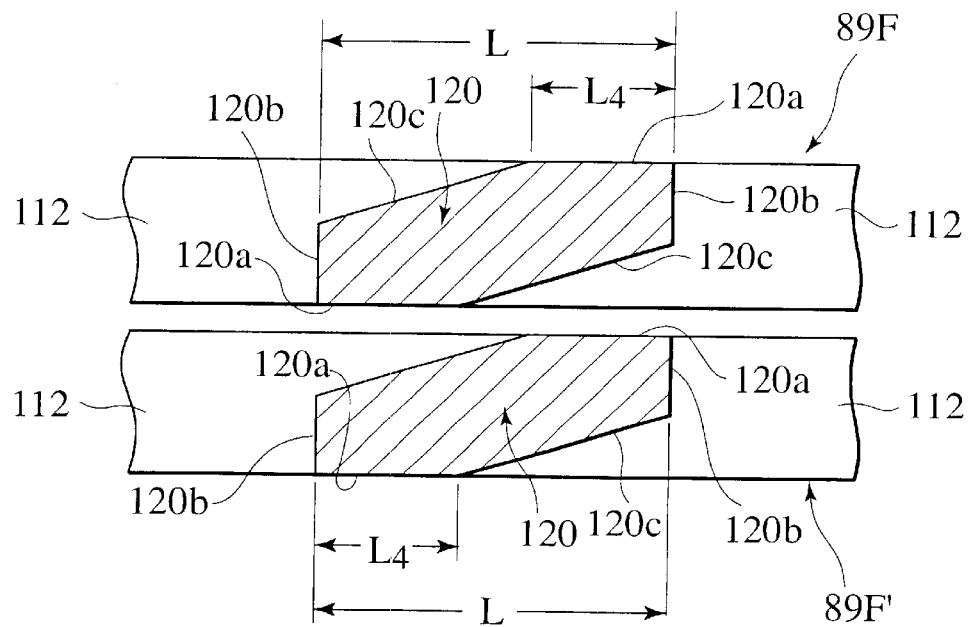
FIG. 30 is an enlarged cross sectional view illustrating a fourth modified form of a bridge portion shown in FIG. 26.

FIG. 30 illustrates a fourth modified form of the clutch plate 89F, wherein inclined walls 120c, 120c are formed only at one side in the circumferential direction, with the inclined walls 120c, 120c being formed at different locations of the opposing walls 120a, 120a at upper ad lower sides of the clutch plate 89F such that a modified hexagonal cross sectional shape is entirely defined. In such a case, also, the adjacent opposing clutch plate 89F' is formed with inclined walls 120c to compel each of the same to face the opposing wall 120a of the adjacent clutch plate 89F.

Consequently, the modified forms of the clutch plate shown in FIGS. 27 to 30 have capabilities of providing the same functions as those of the clutch plate of the ninth preferred embodiment. Of course, the shape of the bridge portion 120 is not limited to particular configurations indicated in the modified forms and may take any other suitably designed various forms.

Tenth Preferred Embodiment

Figure 31:
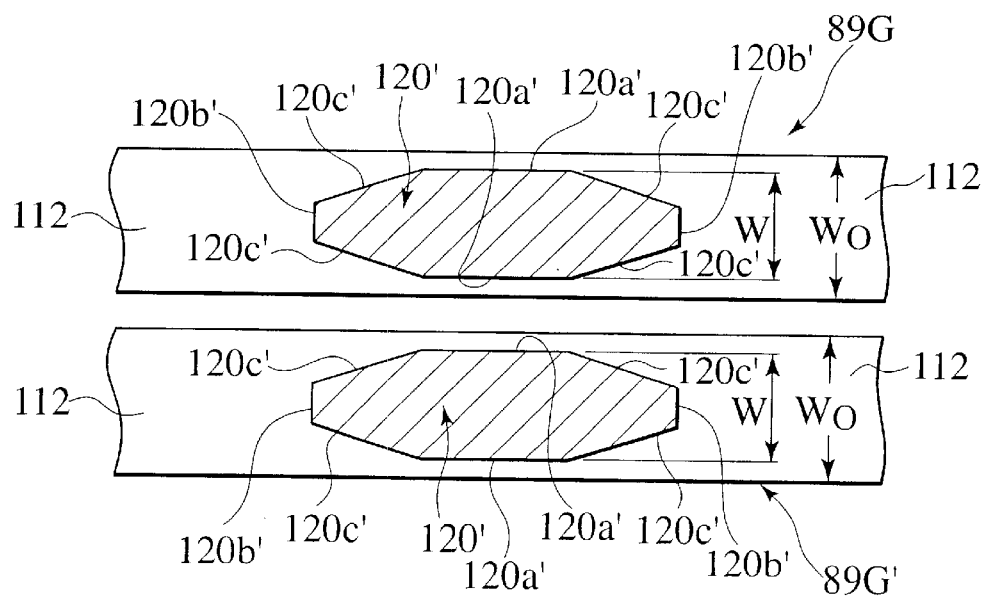
FIG. 31 is an enlarged cross sectional view of a bridge portion forming part of a clutch plate of a tenth preferred embodiment according to the present invention.

FIG. 31 illustrates a tenth preferred embodiment according to the present invention, with like parts bearing the same reference numerals as those used in FIGS. 25 and 26 to omit a redundant description.

FIG. 31 is an enlarged cross sectional view of a clutch plate 89G having a bridge portion 120', which includes opposing walls 120a' one of which faces an adjacent clutch plate 89G', and inner walls 120b' facing respective through-bores 112.

And, the clutch plates 89G, 89G' of the tenth preferred embodiment are formed to permit the bridge portions 120' to have a smaller thickness W than the thickness $W_0$ of the magnetic flux path forming portions 89b, 89c (see FIG. 24) such that the opposing walls 120a' of the mutually adjacent clutch plates 89G, 89G' are separate from one another.

Also, in the presently filed preferred embodiment, the thinned bridge portion 120' is formed at a central area of the thickness $W_0$ of each of the magnetic flux path forming portions 89b, 89c to provide equal spaces $\{(W_0-W)/2\}$ between the opposing walls 120a' at both sides and the both surfaces of the clutch plate 89G, respectively.

Further, the bridge portion 120' of the tenth preferred embodiment has both lengthwise ends, in the circumferential direction, formed with the inclined surfaces 120c' like in the ninth preferred embodiment such that an octagonal cross sectional shape is defined with the opposing walls 120a' in two surfaces, the inner walls 120b' in two surfaces and the inclined walls 120c' in four surfaces.

Accordingly, with the clutch plate 89G of the tenth preferred embodiment, the presence of the bridge portion 120' with a thickness W configured to be smaller than the thickness $W_0$ of the magnetic flux path forming portions 89b, 89c enables the contact surface area between the adjacent opposing walls 120a', 120a' of the bridge portion 120' to be removed to decrease the amount of leakage of the magnetic flux passing through the bridge portion 120', thereby providing the same functions as those of the ninth preferred embodiment set forth above.

By the way, while the ninth and tenth preferred embodiments have been described with reference to cases where each of the inclined walls 120c, 120c' is composed of a flat surface, the inclined walls 120c, 120c' are not limited to the flat surfaces and may be formed in curved convex surfaces contoured in an expanding direction or in concave curved surfaces contoured in a retracting condition.

With the structures set forth above, since the shape of the bridge portion, which is intervened between the adjacent through-bores formed between the magnetic flux path forming portions through which the magnetic flux generated by the electromagnet is circulated, is arranged to have the opposing walls each with a shorter length, along the circumferential periphery of the clutch plate, than the circumferential length of the bridge portion such that at least one of the edges, along the circumferential direction, of each opposing wall is formed to have a reduced thickness portion while enhancing a given cross sectional area, it is possible for the clutch plate to have a reduced contact surface area between the associated opposing walls formed on the bridge portions of the mutually adjacent clutch plates owing to the above described reduced thickness portion while ensuring a strength necessary for connecting the inner peripheral portion and the outer peripheral portion of the clutch plate.

Consequently, since it is possible to reduce the amount of leakage of the magnetic flux passing through the above described magnetic flux path forming portions via the bridge portions, the magnetic flux density generated by the electromagnet can be highly utilized, with a resultant increase in the attracting force of the armature to increase the elimination effect of the slippage of the clutch plates.

Further, with the structures of the modified forms of the ninth preferred embodiment, since the bridge portion is formed to be smaller in thickness than the magnetic flux path forming portion to allow the associated opposing walls of the bridge portions of the mutually adjacent clutch plates to be separate from one another while enhancing the given cross sectional area, he bridge portion is ensured to have a necessary strength due to the given cross sectional area and, at the same time, the absence of the mutual contact between the opposing walls formed on the bridge portions of the adjacent clutch plates enables reduction in the amount of leakage of magnetic flux whereby the magnetic flux generated by the electromagnet is maintained at a high density to increase the elimination effect of the slippage of the clutch plates.

While the clutch plates of various preferred embodiments have been exemplarily described with reference to the example as applied to the component parts of the pilot clutch, the present invention is not limited thereto, and it is needless to say that the present invention may be applied to other various types of wet type friction clutches, electromagnetic clutches or clutch assemblies of other structures. Also, while the oil guide passageways of the clutch plate of the present invention have been described in conjunction with particular shapes, these components may take various alterations or improvements without departing from the scope of the appended claims.

What is claimed is:

1. A wet type friction clutch operatively disposed between first and second torque transmission components, comprising:
   a first plurality of clutch plates disposed for rotation with the first torque transmission component;
   a second plurality of clutch plates interleaved with the first plurality of clutch plates and disposed for rotation with the second torque transmission component;
   a clutch operator operative to selectively render the first and second plurality of clutch plates to engage or disengage; and
   an oil guide passageway formed on at least one of adjacent clutch plates to introduce an oil to sliding areas of the adjacent clutch plates and extending in a given length along circumferential peripheries of the adjacent clutch plates to communicate with an oil chamber to allow the oil to be introduced into the sliding areas of the adjacent clutch plates,
   wherein the oil guide passageway has an edge portion with a thickness smaller than that of a body portion of the clutch plate to define a space between adjacent clutch plates.

2. A wet type friction clutch according to claim 1, wherein the oil guide passageway is formed in a radial direction of the clutch plate and communicates with the oil chamber.

3. A wet type friction clutch according to claim 1, wherein the oil guide passageway is formed to communicate between an outer diameter side and an inner diameter side of the clutch plate.

4. A wet type friction clutch according to claim 1, wherein the oil guide passageway has an edge portion contiguous with an outer surface of the clutch plate via an inclined surface.

5. A wet type friction clutch according to claim 1, wherein the oil guide passageway has opposite ends formed with respective edge portions each configured in a circular arc shape.

6. A wet type friction clutch according to claim 1, wherein the clutch operator comprises an electromagnetic clutch which includes an electromagnetic coil having a magnetic flux path in which the first and second plurality of clutch plates are operatively disposed, and an armature attracted by a magnetic flux of the electromagnet, the first and second plurality of clutch plates having gap portions which form a part of the magnetic flux path, and the oil guide passage being formed between the gap portions.

7. A wet type friction clutch operatively disposed between first and second torque transmission components, comprising:
   a first plurality of clutch plates disposed for rotation with the first torque transmission component;
   a second plurality of clutch plates interleaved with the first plurality of clutch plates and disposed for rotation with the second torque transmission component;
   a clutch operator operative to selectively render the first and second plurality of clutch plates to engage or disengage;
   a first oil guide passageway formed on at least one of adjacent clutch plates to introduce an oil into sliding areas of the adjacent clutch plates; and
   a second oil guide passageway formed on the other one of the adjacent clutch plates;
   wherein the first oil guide passageway is formed to have a volume different from that of the second oil guide passageway to allow the oil to be introduced into the sliding areas of the adjacent clutch plates from the first and second oil guide passageways.

8. A wet type friction clutch according to claim 7, Therein the first oil guide passageway has a larger width in a radial direction of the clutch plate than that of the second oil guide passageway.

9. A wet type friction clutch according to claim the first oil guide passageway has an end portion formed with an extension which radially extends outward and terminates in an area outside an area in which the second oil guide passageway is formed.

10. A wet type friction clutch according to claim 7, wherein the first oil guide passageway has both ends formed with expanded portions, respectively, each of which radially expands in a larger width than that of the second oil guide passageway.

11. A wet type friction clutch according to claim 7, wherein at least one of the first and second oil guide passageways has both lengthwise ends each formed with an edge which is smaller in thickness than a body portion of the clutch plate.

12. A wet type friction clutch according to claim 7, the first and second oil guide passageways are communicable with one another in an axial direction.

13. A wet type friction clutch according to claim 7, wherein the clutch operator comprises an electromagnetic clutch which includes an electromagnetic coil having a magnetic flux path, in which the first and second plurality of clutch plates are operatively disposed, and an armature operative to be retracted by a magnetic flux of the electromagnetic coil, wherein the first and second oil guide passageways form gap portions, respectively, to define magnetic permeability reduction means for establishing the magnetic flux path.

14. A clutch plate for an electromagnetic clutch having a group of clutch plates including first clutch plates disposed for rotation with a drive shaft and second clutch plates interleaved with the first clutch plates and disposed for rotation with a driven shaft, an electromagnet disposed at one side of the group of clutch plates, and an armature disposed at the other side of the group of clutch plates to be retracted by an electromagnetic force generated by the electromagnet for thereby causing the group of clutch plates to be brought into pressured contact such that the clutch plates are coupled, wherein the clutch plate has a plurality of through-bores, formed along a circumferential periphery of the clutch plate in alignment with a magnetic flux path forming portion which establishes a magnetic flux path generated by the electromagnet, between which a bridge portion is intervened for interconnecting an inner circumferential periphery and an outer circumferential periphery of the clutch plate, the clutch plate comprising:
   a body formed with oil guide passageways, composed of the through-bores, and the bridge portions, each of which includes opposing walls facing opposed clutch plates, respectively, and an inner wall facing each of the through-bores, wherein each of the bridge portions is formed such that, while ensuring a given cross sectional area, a circumferentially peripheral length of the opposing wall is shorter than that of each bridge portion.

15. A clutch plate for an electromagnetic clutch having a group of clutch plates including first clutch plates disposed for rotation with a drive shaft and second clutch plates interleaved with the first clutch plates and disposed for rotation with a driven shaft, an electromagnetic coil disposed at one side of the group of clutch plates, and an armature disposed at the other side of the group of clutch plates to be retracted by an electromagnetic force generated by the electromagnetic coil for thereby causing the group of clutch plates to be brought into pressured contact such that the clutch plates are coupled, wherein the clutch plate has a plurality of through-bores, formed along a circumferential periphery of the clutch plate in alignment with a magnetic flux path forming portion which establishes a magnetic flux path generated by the electromagnetic coil, between which a bridge portion is intervened for interconnecting an inner circumferential periphery and an outer circumferential periphery of the clutch plate, the clutch plate comprising:

a body formed with oil guide passageways, composed of the through-bores, and the bridge portions each of which includes opposing walls facing opposed clutch plates, respectively, and an inner wall facing each of the through-bores, wherein each of the bridge portions is formed such that, while ensuring a given cross sectional area, each bridge portion is smaller in thickness than the magnetic flux path forming portion.

* * * * *